(12) United States Patent
Toyama et al.

(10) Patent No.: US 7,146,565 B2
(45) Date of Patent: Dec. 5, 2006

(54) STRUCTURED DOCUMENT EDIT APPARATUS, STRUCTURED DOCUMENT EDIT METHOD, AND PROGRAM PRODUCT

(75) Inventors: Haruhiko Toyama, Kawasaki (JP); Hiroshi Yao, Yokohama (JP); Satoshi Shirai, Yokohama (JP); Tatsunori Kanai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 10/424,727

(22) Filed: Apr. 29, 2003

(65) Prior Publication Data

US 2004/0044965 A1    Mar. 4, 2004

(30) Foreign Application Priority Data

Apr. 30, 2002 (JP) .............................. 2002-129017
Mar. 24, 2003 (JP) .............................. 2003-081213

(51) Int. Cl.
*G06F 15/00* (2006.01)
*G06F 17/00* (2006.01)

(52) U.S. Cl. ...................... 715/513; 715/522; 715/523; 715/524; 715/514; 715/515; 715/516

(58) Field of Classification Search ............... 715/500, 715/513, 522–524, 514–516

See application file for complete search history.

(56) References Cited

U.S. PATENT DOCUMENTS

| | | | | |
|---|---|---|---|---|
| 6,643,652 B1* | 11/2003 | Helgeson et al. | ............. | 707/10 |
| 6,721,747 B1* | 4/2004 | Lipkin | ............. | 707/10 |
| 6,725,231 B1* | 4/2004 | Hu et al. | ............. | 707/102 |
| 6,795,830 B1* | 9/2004 | Banerjee et al. | ............. | 707/200 |
| 6,850,893 B1* | 2/2005 | Lipkin et al. | ............. | 705/8 |
| 2001/0056460 A1* | 12/2001 | Sahota et al. | ............. | 709/201 |
| 2002/0059265 A1* | 5/2002 | Valorose, III | ............. | 707/100 |
| 2002/0099735 A1* | 7/2002 | Schroeder et al. | ............. | 707/513 |
| 2002/0122060 A1* | 9/2002 | Markel | ............. | 345/760 |
| 2002/0147748 A1* | 10/2002 | Huang et al. | ............. | 707/517 |
| 2002/0161803 A1* | 10/2002 | Shelton | ............. | 707/528 |
| 2002/0165881 A1* | 11/2002 | Shelton | ............. | 707/526 |
| 2003/0018832 A1* | 1/2003 | Amirisetty et al. | ............. | 709/328 |
| 2003/0034989 A1* | 2/2003 | Kondo | ............. | 345/630 |
| 2003/0120671 A1* | 6/2003 | Kim et al. | ............. | 707/100 |
| 2003/0120686 A1* | 6/2003 | Kim et al. | ............. | 707/200 |
| 2003/0149935 A1* | 8/2003 | Takizawa et al. | ............. | 715/513 |
| 2003/0177441 A1* | 9/2003 | Clarke et al. | ............. | 715/513 |
| 2003/0177449 A1* | 9/2003 | Rose | ............. | 715/530 |
| 2003/0182305 A1* | 9/2003 | Balva et al. | ............. | 707/103 R |
| 2003/0198934 A1* | 10/2003 | Sendowski et al. | ............. | 434/350 |
| 2004/0205551 A1* | 10/2004 | Santos | ............. | 715/513 |
| 2004/0205571 A1* | 10/2004 | Adler et al. | ............. | 715/513 |
| 2004/0205605 A1* | 10/2004 | Adler et al. | ............. | 715/517 |
| 2004/0205612 A1* | 10/2004 | King et al. | ............. | 715/522 |

OTHER PUBLICATIONS

XmlSpy, User and Reference Manual Version 4.3, Feb. 7, 2002, Altova, pp. 68-71, 117, 121-122, 202.*

(Continued)

*Primary Examiner*—Doug Hutton
*Assistant Examiner*—N Hillery
(74) *Attorney, Agent, or Firm*—Finnegan, Henderson, Farabow, Garrett & Dunner, L.L.P.

(57) ABSTRACT

An apparatus, method, and program product for editing a structured document is disclosed. A transformation unit transforms a first XSLT document into a second XSLT document, to which a command for editing documents is added based on a structure of the first XSLT document. A generation unit generates a second structured document by transforming a first structured document with the second XSLT document.

13 Claims, 42 Drawing Sheets

OTHER PUBLICATIONS

Teach Tech, Microsoft Word: Save/Save As . . . , <http://www.teachtech.ilstu.edu/downloads/pdf/onlineTutorials/saving_word_files_tutorial.pdf>.*

XmlSpy, User and Reference Manual Version 4.3, Feb. 7, 2002, Altova, p. 124.*

XML Spy Document Editor Online Help (in Japanese): 2001.

* cited by examiner

```
<?xml version="1.0" ?>
<booklist>
        <book>
                <title> Genji Monogatari </title>
                <author> Murasaki Shikibu </author>
        </book>
        <book>
                <title> Tsurezuregusa </title>
                <author> Yoshida Kenko </author>
        </book>
</booklist>
```

| Book title | Author name |
|---|---|
| Genji Monogatari | Murasaki Shikibu |
| Tsurezuregusa | Yoshida Kenko |

```
<?xml version="1.0" ?>
<xsl:stylesheet version="1.0" xmlns:xsl="http://www.w3.org/1999/XSL/Transform" >
<xsl:template match="book" >
    <TR>
        <TD>
            <xsl:value-of select="title" >    ← Node value output command 501
        </TD>
        <TD>
            <xsl:value-of select="author" >
        </TD>
    </TR>
</xsl:template>

<xsl:template match="/booklist" >
    <TABLE>
        <TR>
            <TH> Book title </TH>
            <TH> Author name </TH>
        </TR>
        <xsl:apply-templates select="book/" >
    </TABLE>
</xsl:template>
</xsl:stylesheet>
```

F I G. 3

```
<?xml version="1.0" ?>
<xsl:stylesheet version="1.0" xmlns:xsl="http://www.w3.org/1999/XSL/Transform" >
  <xsl:template match="book" >
    <TR>
      <TD>
        <SPAN>
          <xsl:variable name="xpath" >
            <xsl:number level="multiple" count="*" />
          </xsl:variable>
          <xsl:attribute name="editor:xpath" value="{$xpath}" />
          <xsl:value-of select="title" >
        </SPAN>
      </TD>
      <TD>
        <SPAN>
          <xsl:variable name="xpath" >
            <xsl:number level="multiple" count="*" />
          </xsl:variable>
          <xsl:attribute name="editor:xpath" value="{$xpath}" />
          <xsl:value-of select="author" >
        </SPAN>
      </TD>
    </TR>
  </xsl:template>
  <xsl:template match="/booklist" >
    <TABLE>
      <TR>
        <TH>Book title </TH>
        <TH>Author name </TH>
      </TR>
      <xsl:apply-templates select="book/" >
    </TABLE>
  </xsl:template>
</xsl:stylesheet>
```

Portion where node value output command is replaced

F I G. 12

| Book title | Author name | |
|---|---|---|
| Genji Monogatari | Murasaki Shikibu | |
| Tsurezuregusa | | Yoshida Kenko |

Update data input unit

FIG. 16

```
<xsl:template match="book">
  <TR>
    <TD>
      <xsl:variable name="xpath">
        <xsl:number level="multiple" count="*" />      — 2102
      </xsl:variable>
      <xsl:attribute name="editor:xpath" value="{$xpath}" />
    </TD>
    <TD>                                                — 2103
      <xsl:variable name="xpath">
        <xsl:number level="multiple" count="*" />      — 2104
      </xsl:variable>
      <xsl:attribute name="editor:xpath" value="{$xpath}" />
      <SPAN>
        <xsl:value-of select="title" >
      </SPAN>
    </TD>
    <TD>                                                — 2105
      <xsl:variable name="xpath">
        <xsl:number level="multiple" count="*" />      — 2106
      </xsl:variable>
      <xsl:attribute name="editor:xpath" value="{$xpath}" />
      <SPAN>
        <xsl:value-of select="author" >
      </SPAN>
    </TD>
  </TR>
</xsl:template>
```

FIG. 18

```
<TABLE xpath="1">
    <TR xpath="1">
        <TH xpath="1"> Book title </TH>
        <TH xpath="1"> Author name </TH>
    </TR>
    <TR xpath="1.1">
        <TD xpath="1.1"><SPAN xpath="1.1.1"> Genji Monogatari </SPAN></TD>
        <TD xpath="1.1"><SPAN xpath="1.1.2"> Murasaki Shikibu </SPAN></TD>
    </TR>
    <TR xpath="1.2">
        <TD xpath="1.2"><SPAN xpath="1.2.1"> Tsurezuregusa </SPAN></TD>
        <TD xpath="1.2"><SPAN xpath="1.2.2"> Yoshida Kenko </SPAN></TD>
    </TR>
</TABLE>
```

FIG. 19

```
<xsl:template match="book">
  <TR>
    <xsl:attribute name="editor:stylepath" value="1.1.1" />         ~2301
    <TD>
      <xsl:attribute name="editor:stylepath" value="1.1.1.1" />     ~2302
      <SPAN>
        <xsl:attribute name="editor:stylepath" value="1.1.1.1.1" /> ~2303
        <xsl:value-of select="title" >
      </SPAN>
    </TD>
    <TD>
      <xsl:attribute name="editor:stylepath" value="1.1.1.2" />     ~2304
      <SPAN>
        <xsl:attribute name="editor:xpath" value="1.1.1.2.1" />     ~2305
        <xsl:value-of select="author" >
      </SPAN>
    </TD>
  </TR>
</xsl:template>
```

FIG. 20

```
2201
<TABLE stylepath="1.2.1">
    <TR stylepath="1.2.1.1">
        <TH stylepath="1.2.1.1.1">Book title</TH>
        <TH stylepath="1.2.1.1.2">Author name</TH>
    </TR>
    <TR stylepath="1.1.1">
        <TD stylepath="1.1.1.1"><SPAN stylepath="1.1.1.1.1">Genji Monogatari</SPAN></TD>
        <TD stylepath="1.1.1.1"><SPAN stylepath="1.1.1.1.1">Murasaki Shikibu</SPAN></TD>
    </TR>
2202─<TR stylepath="1.1.1">
        <TD stylepath="1.1.1.1"><SPAN stylepath="1.1.1.1.1">Tsurezuregusa</SPAN></TD>
        <TD stylepath="1.1.1.1"><SPAN stylepath="1.1.1.1.1">Yoshida Kenko</SPAN></TD>
    </TR>
</TABLE>
```

FIG. 21

2501
`<xsl:template match="book" >`

2502
`<debug:templateresult>`

2503 `<xsl:attribute name="templatepath" value="1.1" />`
2504 `<xsl:variable name="xpath" ><xsl:number level="multiple" count="*" /></xsl:variable>`
`<xsl:attribute name="xpath" value="{$xpath}" />`

2505
```
<TR> <TD> <SPAN><xsl:variable name="xpath" >
              <xsl:number level="multiple" count="*" />
            </xsl:variable>
            <xsl:attribute name="editor:xpath" value="{$xpath}" />
            <xsl:value-of select="title" >
        </SPAN>
    </TD>
    <TD> <SPAN><xsl:variable name="xpath" >
              <xsl:number level="multiple" count="*" />
            </xsl:variable>
            <xsl:attribute name="editor:xpath" value="{$xpath}" />
            <xsl:value-of select="author" >
        </SPAN>
    </TD>
</TR>
```

Portion different from FIG. 12

2506
`</debug:templateresult>`

2507
`</xsl:template>`

FIG. 23

| Order of application | Applied template | Node of XML document applied to template |
|---|---|---|
| 2 | ```<xsl:template match="book">
  <TR>
    <TD>
      <xsl:value-of select="title" >
    </TD>
    <TD>
      <xsl:value-of select="author" >
    </TD>
  </TR>
</xsl:template>``` (2701) | ```<book>
  <title>Tsurezuregusa</title>
  <author>Yoshida Kenko</author>
</book>``` (2703) |
| 1 | ```<xsl:template match="/booklist">
  <TABLE>
    <TR>
      <TH> Book title </TH>
      <TH> Author name </TH>
    </TR>
    <xsl:apply-templates select="book" />
  </TABLE>
</xsl:template>``` (2702) | ```<booklist>
  <book>
    <title>Genji Monogatari</title>
    <author>Murasaki Shikibu</author>
  </book>
  <book>
    <title>Tsurezuregusa</title>
    <author>Yoshida Kenko</author>
  </book>
</booklist>``` (2704) |

FIG. 25

```
<?xml version="1.0" ?>
<ruleset>
```
Addition target component designation field 3002

```
<rule target="xslt" match="xsl:template[@match='book']/tr/td[1]/xsl:value-of">
```
Rule 3001

```
if="position()=1">
```
Addition condition field 3004

```
<textarea/>
```
Addition component field 3003 (Input by means of text box)

```
</rule>
<rule target="xslt" match="xsl:template[@match='book']/tr/td[2]/xsl:value-of" >
```
Rule 3001

Addition target component designation field 3002

```
<SELECT>
<OPTION>Murasaki Shikibu</OPTION>
<OPTION>Yoshida Kenko</OPTION>
<OPTION>Seishonagon</OPTION>
</SELECT>
```
Addition component field (Input by means of selection from three candidates) 3003

```
</rule>
</ruleset>
```

FIG. 28

```
<?xml version="1.0" ?>
<xsl:stylesheet version="1.0" xmlns:xsl="http://www.w3.org/1999/XSL/Transform" >
  <xsl:template match="book" >
    <TR>
      <TD>
        <xsl:choose><xsl:when test="position()=1" >
          <textarea>
            <xsl:attribute name="xpath" >
              <xsl:number level="multiple" count="*" />
            </xsl:attribute>
            <xsl:value-of select="title" >
          </textarea>
        </xsl:when>
        <xsl:otherwise><xsl:value-of select="title" ></xsl:otherwise>
        </xsl:choose>
      </TD>
```

Add input function by means of text box 3001

F I G. 29A

```
<TD>
<SELECT>
<xsl:attribute name="xpath"><xsl:number level="multiple" count="*"/></xsl:attribute>
<OPTION>
  <xsl:if test="string() == 'Murasaki Shikibu'"><xsl:attribute name="SELECTED"></xsl:attribute></xsl:if>
  Murasaki Shikibu
</OPTION>
<OPTION>
  <xsl:if test="string() == 'Yoshida Kenko'"><xsl:attribute name="SELECTED"></xsl:attribute></xsl:if>
  Yoshida Kenko
</OPTION>
<OPTION>
  <xsl:if test="string() == 'Seishonagon'"><xsl:attribute name="SELECTED"></xsl:attribute></xsl:if>
  Seishonagon
</OPTION>
</SELECT>
</TD>
```

Add input function by means of selection box 3011

```
    </TR>
  </xsl:template>
  <xsl:template match="/booklist">
    <TABLE><TR><TH>Book title</TH><TH>Author name</TH></TR>
    <xsl:apply-templates select="book"/>
    </TABLE>
  </xsl:template>
  <xsl:template>
</xsl:stylesheet>
```

F I G. 29B

```
<xsl:choose>
    <xsl:when test="position()=1" >          ─ Component that
        <textarea>                              checks condition
                                                                    Command "add link to source XML as attribute
            <xsl:attribute name="xpath" >                           to immediately preceding output component"
                <xsl:number level="multiple" count="*" />
            </xsl:attribute>
            <xsl:value-of select="title" >
        </textarea>
    </xsl:when>─ Command "output text box"
    <xsl:otherwise>
        <xsl:value-of select="title" >  ─ When condition is not met
    </xsl:otherwise>                       (same as original style)
</xsl:choose>
```

FIG. 30

```
<xsl:template match="author" mode="customize-rule">
  <SELECT>                                          Command "add link to source XML as attribute
                                                    to immediately preceding output component"
    <xsl:attribute name="xpath"><xsl:number level="multiple" count="*"/></xsl:attribute>
    <OPTION><xsl:if test="string()=='Murasaki Shikibu'"><xsl:attribute name="SELECTED"></xsl:attribute></xsl:if>
    Murasaki Shikibu
    </OPTION>
    <OPTION><xsl:if test="string()=='Yoshida Kenko'"><xsl:attribute name="SELECTED"></xsl:attribute></xsl:if>
    Yoshida Kenko
    </OPTION>
    <OPTION><xsl:if test="string()=='Seishonagon'"><xsl:attribute name="SELECTED"></xsl:attribute></xsl:if>
    Seishonagon
    </OPTION>                                       Command "select selection
                                                    candidate depending on
                                                    value of XML document"
                                                    Command "display candidates in selection box"
  </SELECT>
  Command "output selection box"
</xsl:template>
```

FIG. 31

```
<TABLE>
  <TR>
    <TH>Book title</TH>
    <TH>Author name</TH>
  </TR>
  <TR>
    <TD><TEXTAREA xpath="1.1.1">Genji Monogatari</TEXTAREA></TD>    Input by means of text box 3020
    <TD>
      <SELECT xpath="1.2.1">
        <OPTION value="Murasaki Shikibu" [SELECTED]>    Attribute indicating that current value is "Murasaki Shikibu"
        <OPTION value="Yoshida Kenko">
        <OPTION value="Seishonagon">
      </SELECT>                                         Input by means of selection box 3021
    </TD>
  </TR>
  <TR>
    <TD>Tsurezuregusa</TD>
    <TD>
      <SELECT xpath="1.2.2">
        <OPTION value="Murasaki Shikibu">
        <OPTION value="Yoshida Kenko" [SELECTED]>       Attribute indicating that current value is "Yoshida Kenko"
        <OPTION value="Seishonagon">
      </SELECT>                                         Input by means of selection box 3021
    </TD>
  </TR>
</TABLE>
```

F I G. 32

```xml
<?xml version="1.0" ?>
<ruleset>
    <rule target="xml" match="title[position()=1]" >   <!-- Rule 3001, Addition target component designation field 3002 -->
        <textarea/>   <!-- Addition component field (Input by means of text box) 3003 -->
    </rule>
    <rule target="xml" match="author" >   <!-- Rule 3001, Addition target component designation field 3002 -->
        <SELECT>
            <OPTION>Murasaki Shikibu</OPTION>
            <OPTION>Yoshida Kenko</OPTION>
            <OPTION>Seishonagon</OPTION>
        </SELECT>
        <!-- Addition component field (Input by means of selection from three candidates) 3003 -->
    </rule>
</ruleset>
```

F I G. 35

```
<?xml version="1.0"?>
<xsl:stylesheet version="1.0" xmlns:xsl="http://www.w3.org/1999/XSL/Transform">
    <xsl:template match="book">
        <TR>
            <TD>
                [<xsl:apply-templates select="title" mode="customize-rule"/>]
            </TD>
            <TD>
                [<xsl:apply-templates select="author" mode="customize-rule"/>]
            </TD>
        </TR>
    </xsl:template>
    <xsl:template match="/booklist">
        <TABLE>
            <TR>
                <TH>Book title</TH>
                <TH>Author name</TH>
            </TR>
            <xsl:apply-templates select="book"/>
        </TABLE>
    </xsl:template>
```

Transformed portion of template of XSLT document 3030

Portion where node value output command is replaced

FIG. 36A

```
<xsl:template match="title[position()=1]" mode="customize-rule" >
  <TEXTAREA>
    <xsl:attribute name="xpath"><xsl:number level="multiple" count="*" /></xsl:attribute>
    <xsl:value-of select="." >
  </TEXTAREA>
</xsl:template>
<xsl:template match="author" mode="customize-rule" >
  <SELECT>
    <xsl:attribute name="xpath"><xsl:number level="multiple" count="*" /></xsl:attribute>
    <OPTION>
      <xsl:if test="string() == 'Murasaki Shikibu'" ><xsl:attribute name="SELECTED" ></xsl:if>
      Murasaki Shikibu
    </OPTION>
    <OPTION>
      <xsl:if test="string() == 'Yoshida Kenko'" ><xsl:attribute name="SELECTED" ></xsl:if>
      Yoshida Kenko
    </OPTION>
    <OPTION>
      <xsl:if test="string() == 'Seishonagon'" ><xsl:attribute name="SELECTED" ></xsl:if>
      Seishonagon
    </OPTION>
  </SELECT>
</xsl:template>
<xsl:template match="*|@*|text()" mode="customize-rule" >
  <xsl:value-of select="." >
</xsl:template>
</xsl:stylesheet>
```

- First title node of XML document uses input by means of text input box
- Portion obtained by transforming rule in definition document into XSLT template 3031
- Author node of XML document uses input using selection input box
- Non-editable default template 3032

FIG. 36B

```
Corresponding to addition target component
designation field of definition document
                                          Command "add obtained value to immediately preceding
                                          output component as attribute value"
<xsl:template match="title" mode="customize-rule" >
    <TEXTAREA>
        <xsl:attribute name="xpath" ><xsl:number level="multiple" count="*"/></xsl:attribute>
        <xsl:value-of select="." /> ~ "Node value output command"
    </TEXTAREA>  Command "output text box"
</xsl:template>
```

FIG. 37

```
<xsl:template match="author" mode="customize-rule" >
    <SELECT>                    Command "add link to source XML
                                as attribute to immediately preceding
                                output component"
                                        Command "select selection candidate
                                        depending on value of XML document"
        <xsl:attribute name="xpath" ><xsl:number level="multiple" count="*" /></xsl:attribute>
        <OPTION><xsl:if test="string() == 'Murasaki Shikibu'" ><xsl:attribute name="SELECTED" ></xsl:attribute></xsl:if>
            Murasaki Shikibu
        </OPTION>
        <OPTION><xsl:if test="string() == 'Yoshida Kenko'" ><xsl:attribute name="SELECTED" ></xsl:attribute></xsl:if>
            Yoshida Kenko
        </OPTION>
        <OPTION><xsl:if test="string() == 'Seishonagon'" ><xsl:attribute name="SELECTED" ></xsl:attribute></xsl:if>
            Seishonagon
        </OPTION>                       Command "display candidates in selection box"
    </SELECT>    Command "output selection box"
</xsl:template>
```

F I G. 38

PRIOR ART
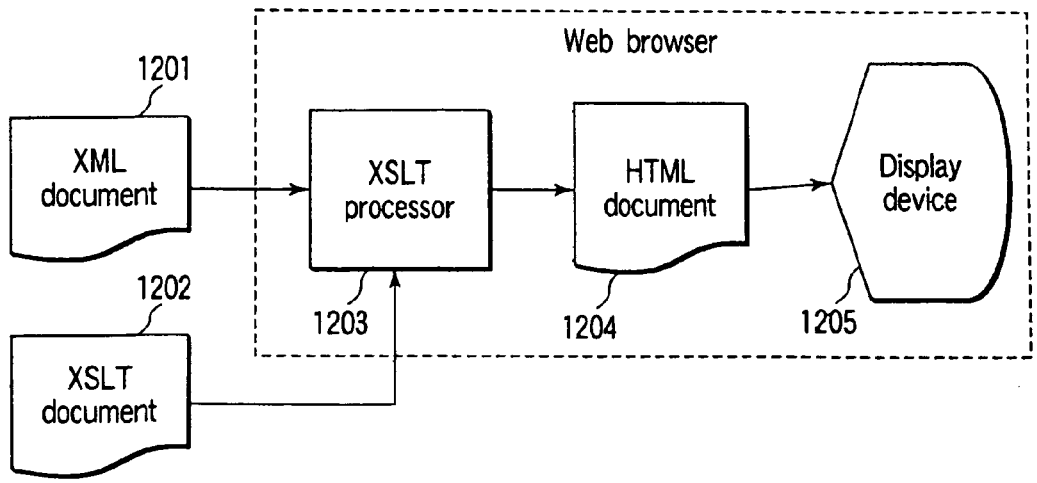
F I G. 43
PRIOR ART
```
<TABLE>
        <TR>
                    <TH> Book title </TH>
                    <TH> Author name </TH>
        </TR>
        <TR>
                    <TD> Genji Monogatari </TD>
                    <TD> Murasaki Shikibu </TD>
        </TR>
        <TR>
                    <TD> Tsurezuregusa </TD>
                    <TD> Yoshida Kenko </TD>
        </TR>
</TABLE>
```
F I G. 44

STRUCTURED DOCUMENT EDIT APPARATUS, STRUCTURED DOCUMENT EDIT METHOD, AND PROGRAM PRODUCT

CROSS-REFERENCE TO RELATED APPLICATIONS

This application is based upon and claims the benefit of priority from the prior Japanese Patent Applications No. 2002-129017, filed Apr. 30, 2002; and No. 2003-81213, filed Mar. 24, 2003, the entire contents of both of which are incorporated herein by reference.

BACKGROUND OF THE INVENTION

1. Field of the Invention

The present invention relates to a structured document edit apparatus, structured document edit method, and program product, which are used to edit a structured document on a display screen.

2. Description of the Related Art

In recent years, Internet technologies and, especially, Web technologies have prevailed, and documents described in HTML (Hypertext Markup Language) can be browsed everywhere independently of the types of operating system and Web browser.

In an HTML document, text and style information (information associated with the way of display on a screen such as font size, font type, text color, background color, table width, and the like) are mixed. Also, tags which bound text in the document have only information associated with a structure on a screen. For these reasons, the content of the HTML document is not easy to use as information used by a computer. Hence, as one of structured document techniques for structuring a document by bounding text by tags with some meanings, XML (eXtensible Markup Language) has been standardized and prevalently used.

On the other hand, it is not easy for the user to read an XML document itself. Hence, as one of style techniques for shaping an XML document into an easy-to-read form by transforming it into an HTML document by appending style information and the like, and allowing the user to browse the transformed document in a Web browser, XSLT (XSL Transformation) has been developed and standardized.

XSLT is a program language for transforming an XML document described in XML, and a program that executes an XSLT document described in XSLT to convert an XML document is called an XSLT processor. Nowadays, Web browsers that incorporate the XSLT processor are increasingly prevalent.

As means for editing this XML document, a method of directly editing data using a text editor, and a method of manipulating data on a hierarchical structure using a dedicated editor are available. In addition, when data items are fixed like an XML document for a specific application, a method of generating an HTML form dedicated to that application, and updating a source XML document by a Web server on the basis of the contents input to that form is available.

On the other hand, in order to edit an XSLT document, a method of using a dedicated edit apparatus, and a method of directly editing an XSLT document using a text editor are available. Also, as a debug method of confirming if transformation in an XSLT document correctly works, a method of using a dedicated debugger, and a debug method of rewriting an XSLT document and confirming the result in a Web browser are used.

As structured documents obtained by transforming an XML document by an XSLT document, for example, an XHTML (eXtensible Hypertext Markup Language) document, SVG (Scalable Vector Graphics) document, MathML (Mathematical Markup Language) document, and the like are known in addition to an HTML document.

However, the aforementioned conventional techniques suffer the following problems as XML document edit means.

When an XML document is transformed into an HTML document by arbitrary XSLT, a source XML document cannot be edited on a screen image displayed in a Web browser. That is, with such XML document edit means, text that is hard for the people to read must be edited, or an XML document must be edited using an editor having a dedicated screen such as a hierarchical structure or the like. Also, a dedicated input screen must be prepared for each data structure of an XML document for a specific purpose.

A method of modifying an XSLT processor that transforms an XML document into an HTML document so as to store correspondence between the screen image and XML document nodes, and allowing to reflect the edit results on the screen image on a source XML document may be used. However, since this method requires a special Web browser having a particular XSLT processor, a feature of the Web technology that allows every Web browser to browse may be disturbed.

Likewise, since an XSLT document used to transform an XML document into an HTML document cannot be edited in a Web browser, style information and the like appended by XSLT cannot be changed in the Web browser.

Also, since a template in an XSLT document used to generate nodes of an HTML document in a Web browser cannot be examined, it is difficult to debug XSLT on the screen image displayed in the Web browser.

Furthermore, upon editing an XML document, it is often required to allow to edit an XML document only partially in correspondence with the authority or the like. Moreover, it is demanded for an edit method to allow designations by means of inputs using text boxes and selection inputs using selection boxes. However, an XML document and XSLT document cannot describe such edit functions.

The same applies to a case wherein transformed structured documents are those other than an HTML document.

BRIEF SUMMARY OF THE INVENTION

The present invention has been made in consideration of the above situation, and has as its object to provide a structured document edit apparatus, structured document edit method, and program product, which can edit and debug a source structured document and an XSLT document on a screen image obtained by transforming a structured document by XSLT.

According to one embodiment of the present invention, there is provided a structured document edit apparatus. The apparatus comprises a transformation unit and a generation unit. The transformation unit transforms a first XSLT document into a second XSLT document, to which a command for editing documents is added based on a structure of the first XSLT document. The generation unit transforms a first structured document with the second XSLT document.

BRIEF DESCRIPTION OF THE SEVERAL VIEWS OF THE DRAWING

FIG. 3 shows an example of an XSLT document;

FIG. 12 shows an example of a transformed XSLT document;

FIG. 16 shows an example of a display screen with which an update data input unit of the XML document edit apparatus according to the embodiment of the present invention receives a data input in a browser;

FIG. 18 shows still another example of a transformed XSLT document;

FIG. 19 shows another example of data to be generated by the XSLT processor of the XML document edit apparatus according to the embodiment of the present invention;

FIG. 20 shows still another example of a transformed XSLT document;

FIG. 21 shows an example of data generated by the XSLT processor of the XML document edit apparatus according to the embodiment of the present invention;

FIG. 23 shows still another example of a transformed XSLT document;

FIG. 25 shows a display example of an XSLT template in a browser by an XSLT debug function;

FIG. 28 shows an example of a definition document;

FIGS. 29A and 29B show still another example of a transformed XSLT document;

FIG. 30 shows still another example of a transformed XSLT document;

FIG. 31 shows still another example of a transformed XSLT document;

FIG. 32 shows an example of a transformed document (an HTML document appended with a function designated by a definition document);

FIG. 35 is a functional block diagram showing still another example of the configuration of the XML document edit apparatus according to the embodiment of the present invention;

FIGS. 36A and 36B show still another example of a transformed XSLT document;

FIG. 37 shows still another example of a transformed XSLT document;

FIG. 38 shows still another example of a transformed XSLT document;

FIG. 43 is a view for explaining prior art;

FIG. 44 is a view for explaining prior art; and

DETAILED DESCRIPTION OF THE INVENTION

A preferred embodiment of the present invention will be described hereinafter with reference to the accompanying drawings.

Figures 1, 2, 4:
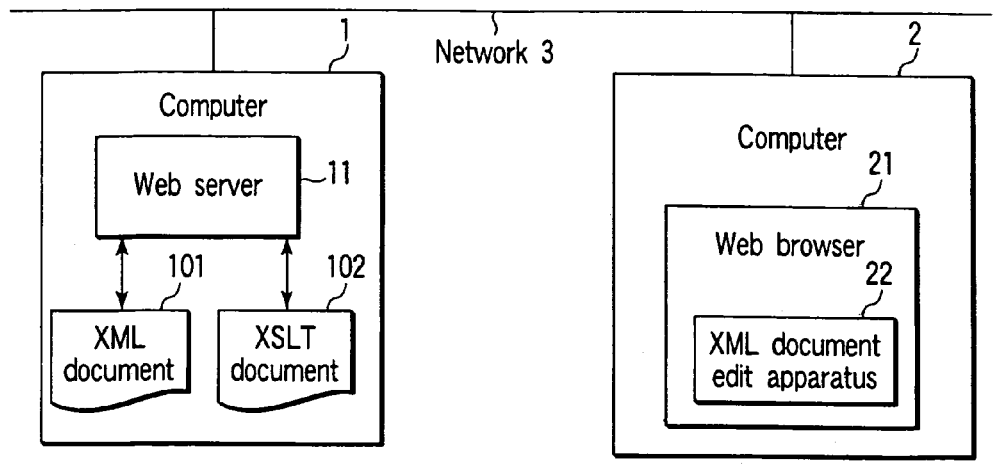
FIG. 1 is a block diagram showing an example of the configuration of a structured document edit system according to an embodiment of the present invention.
FIG. 2 shows an example of an XML document.
FIG. 4 shows a display example in a browser.

FIG. 1 shows an example of the configuration of a structured document edit system according to this embodiment of the present invention.

As shown in FIG. 1, in this system, a Web server 11 is implemented on a computer 1, and a Web browser 21 is implemented on a computer 2. The computers 1 and 2 are connected via a network 3, and the Web server 11 on the computer 1 and Web browser 21 on the computer 2 can exchange an XML document 101 and XSLT document 102 as data.

When the user operates an XML document edit apparatus (structured document edit apparatus) 22 built in the Web browser 21 installed in the computer 2, he or she can browse and edit the XML document 101 and XSLT document 102 stored in the computer 1 via the network 3 and Web server 11.

Note that the network 3 may be a wired network, wireless network, or a network including both wired and wireless parts. Also, the network 3 may be the Internet, a home or office network, or a communication provider network. Furthermore, the Web server may be located on the Internet, and the Web browser may be located on a LAN.

FIG. 1 illustrates only one computer 2 installed with the Web browser 21. However, a plurality of computers similar to the computer 2 installed with the Web browser 21 may be connected.

Also, the Web server 11 of the computer 1, and the XML document 101 and XSLT document 102 may be set in the computer 2, and the computer 1 and network 3 may be omitted.

The computer 2 may comprise a portable phone terminal, network home electric appliance, or the like, which incorporates a CPU.

In the following description, virtual circuit blocks corresponding to respective functions and processes will be explained since these functions and processes are implemented when predetermined software controls a computer and peripheral devices, and respective hardware or software components need not always have a one-to-one correspondence to those blocks. Some or all of the functions and processes to be described below, or a Web browser itself which incorporates these functions and processes, can be implemented by hardware such as a semiconductor chip or the like.

The XML document edit apparatus 22 transforms an objective XML document into another structured document on the basis of a predetermined XSLT document. As the transformed structured documents, various formats can be used, and for example, an XHTML (eXtensible Hyper Text Markup Language) document, SVG (Scalable Vector Graphics) document, MathML (Mathematical Markup Language) document, another XML document (obtained by, e.g., modifying a source XML document), and the like are available. The transformed structured document to be used is determined depending on those supported by the Web browser.

In the following description, assume that an HTML document is used as the transformed structured document.

FIG. 2 shows an example of an XML document used in the following description, FIG. 3 shows an example of an XSLT document used in the following description, and FIG. 4 shows an example of a screen when the HTML document is browsed on the browser. In the following description, "nodes" in structured documents such as an HTML document, XML document, XSLT document, and the like indicate tags, text, attributes, and the like, and "tags" indicate portions such as <book>, <TABLE>, and the like in FIG. 2 and FIG. 7 (to be described later).

(Configuration of XML Document Browser System Using Web Browser According to Prior Art)

A conventional system which transforms an XML document into an HTML document by an XSLT document, and then allows the user to browse the HTML document in a Web browser will be explained below.

FIG. 43 is a functional block diagram of the conventional system. In the conventional system, an XML document 1201 (see FIG. 2) on a Web server is transformed into an HTML document 1204 shown in, e.g., FIG. 44 by an XSLT processor 1200, and the transformed HTML document is displayed on a display device 205 in a Web browser 1200 (see FIG. 4). At this time, the transformation method into the HTML document is defined by an XSLT document 1202 (see FIG. 3) on the Web server.

In addition to the configuration in which the XSLT processor 1203 is arranged in the Web browser 1200, which transforms and displays an HTML document, a configuration in which the XSLT processor 1203 is arranged on a computer on the Web server which transforms into an HTML document, and the transformed HTML document is sent to the Web browser 1200 is available.

In either of these conventional systems, since the correspondence between nodes in the transformed HTML document 1204 displayed on the screen, and those in the source XML document 1201 is not specified, the source XML document 1201 cannot be edited in the Web browser 1200.

Figure 45:
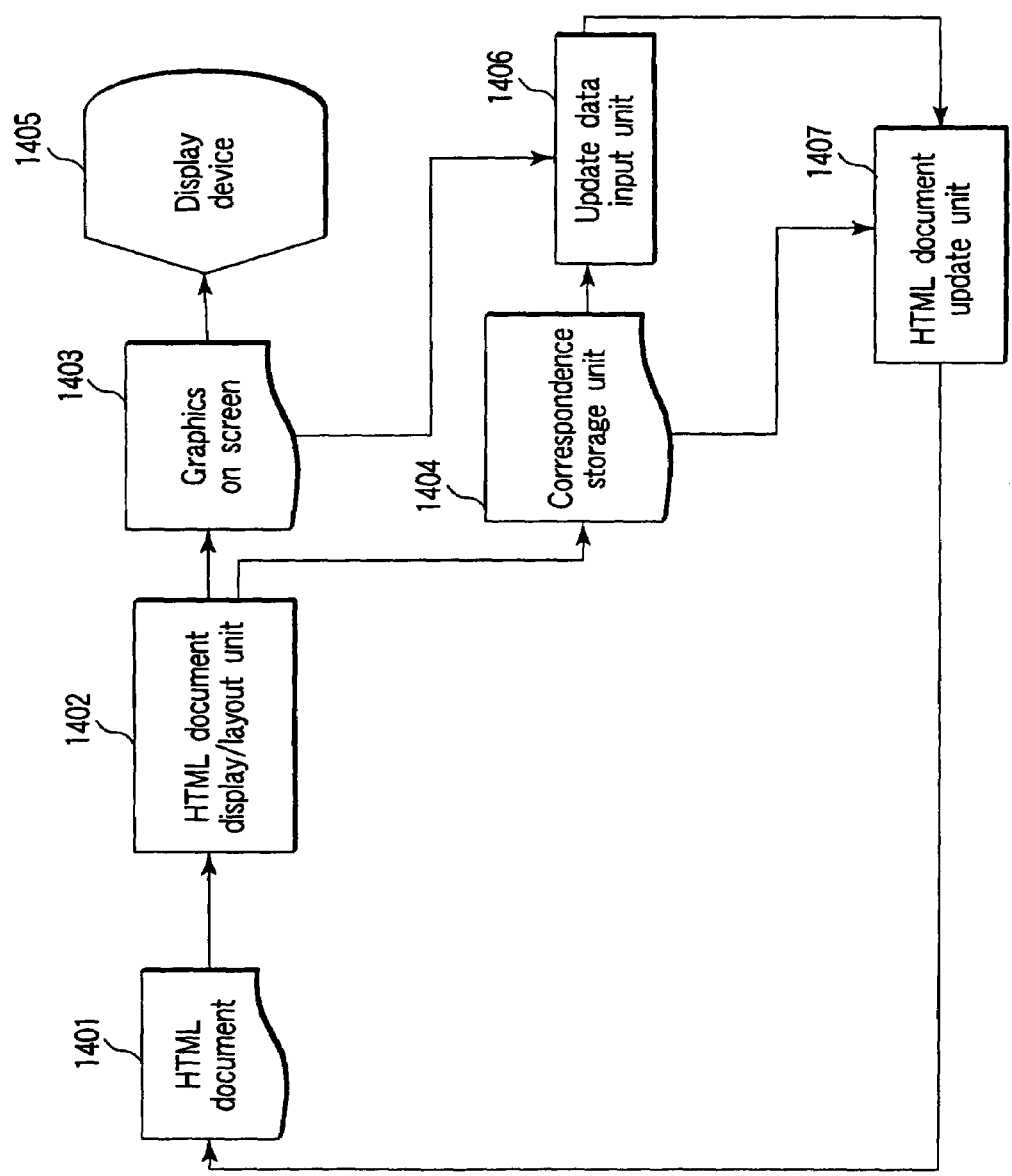
FIG. 45 is a view for explaining prior art.

FIG. 45 is a functional block diagram of an HTML editor of the conventional system. An HTML document display/layout unit 1402 loads an HTML document 1401, generates graphics data 1403 on a screen, and displays the generated data on a display screen 1405. In this case, the correspondence between the graphics data on the screen and the nodes in the HTML document is stored in a correspondence storage unit 1404. When the user inputs update data via an update data input unit 1406, an HTML update unit 1407 updates a corresponding portion of the HTML document 1401 with reference to the stored correspondence. In this manner, using the correspondence stored in the correspondence storage unit 1404, the HTML editor implements a function of editing an HTML document before transformation on the screen image. When this configuration is applied to an XML document edit apparatus, an XSLT processor must be modified to store the correspondence, and an edit process in an existing Web browser cannot be implemented.

(Configuration of XML Edit Apparatus)

Figure 5:
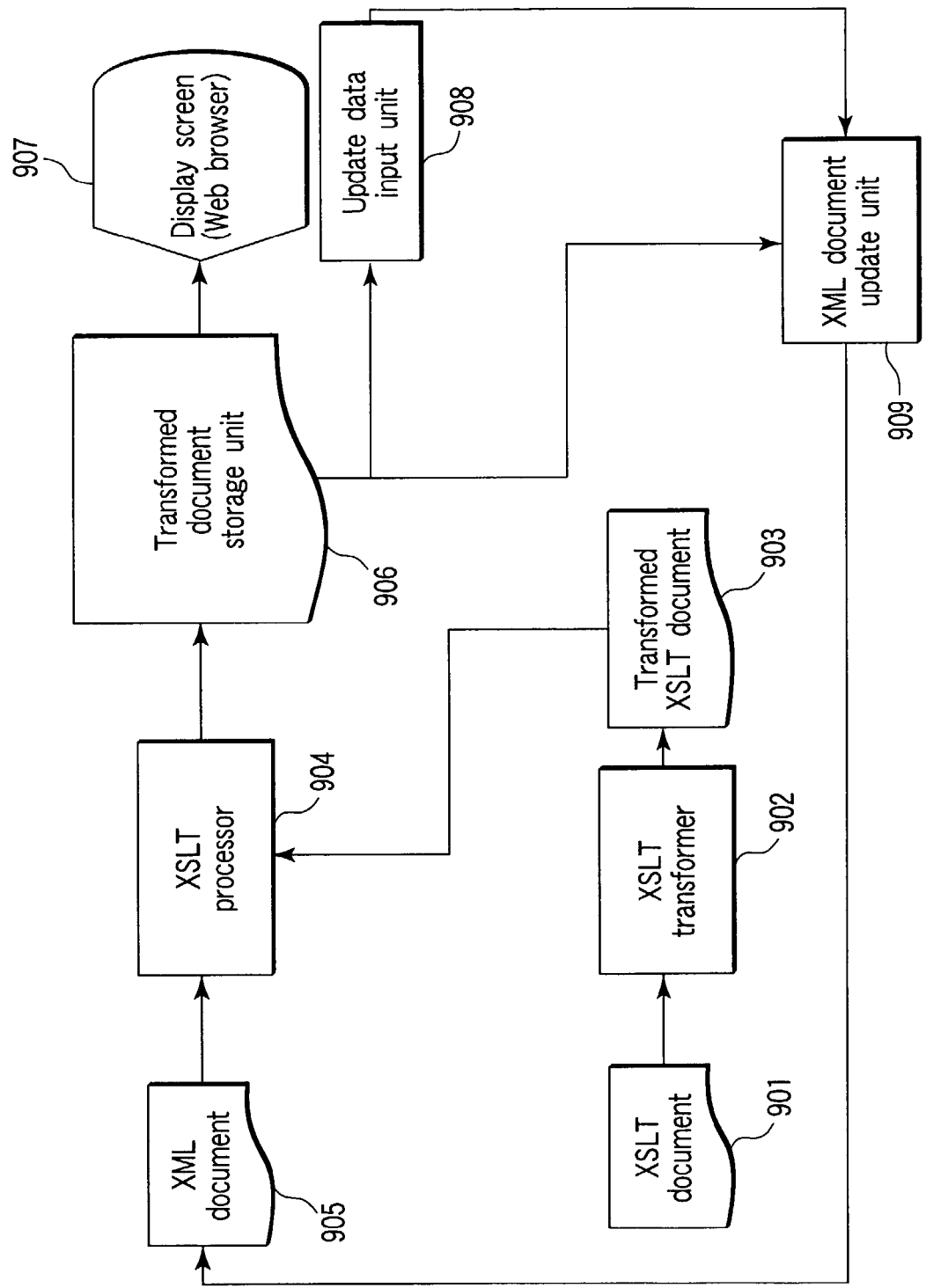
FIG. 5 is a functional block diagram showing an example of the configuration of an XML document edit apparatus according to the embodiment of the present invention.

FIG. 5 shows an example of the configuration of an XML document edit apparatus (structured document edit apparatus) according to the embodiment of the present invention.

As shown in FIG. 5, an XML document edit apparatus (22 in FIG. 1) of this embodiment comprises an XSLT processor 904, XSLT transformer 902, transformed document storage unit 906, updated data input unit 908, and XML document update unit 909.

An XML document 905 is acquired from, e.g., the Web server 11 in FIG. 1, and its example is shown in FIG. 2 presented previously. Note that the contents of the XML document 905 change as they are updated by user's edit operations and the like.

An XSLT document 901 is acquired from, e.g., the Web server 11 in FIG. 1, and its example is shown in FIG. 3 presented previously.

The XSLT transformer 902 receives the XSLT document 901, and executes a transformation process into a transformed XSLT document 903 as another XSLT document. That is, in this embodiment, the transformed XSLT document 903 is passed to the XSLT processor 904 in place of the source XSLT document 901.

Note that FIG. 5 shows an example wherein the XSLT transformer 902 and the XSLT processor 904 are arranged in the identical computer (2 in FIG. 1). However, the XSLT transformer 902 may be arranged in the computer (1 in FIG.

1) in which the Web server is arranged. Also, the XSLT transformer 902 may be implemented by a script in the Web browser 21.

The XSLT processor 904 transforms an XML document 905 in accordance with commands described in the (transformed) XSLT document 903, and passes the transformation result to the transformed document storage unit 906. The specification of the XSLT processor 904 may comply with that standardized by W3C as a standardization group (more specifically, the XSLT processor 904 is implemented by a function added to the Web browser).

The transformed document storage unit 906 holds data used to generate a screen display on a display device 907, and data used to refer to nodes in the source XML document 905 from screen building components.

The display device 907 is implemented by a screen or the like of the Web browser 21, and displays the data used to generate a screen display in the transformed document storage unit 906.

The update data input unit 908 is used to input update data in the Web browser 21. More specifically, the unit 908 is implemented by a script, text input boxes, and the like in the Web browser 21.

The XML document update unit 909 is implemented by, e.g., a script and the like in the Web browser 21. The unit 909 has a function of receiving links to nodes in the source XML document from the transformed document storage unit 906, and input data from the update data input unit 908, and updating the source XML document 905 on the Web server.

(Configuration in which XSLT Processor is Arranged on Server Side)

Figure 6:
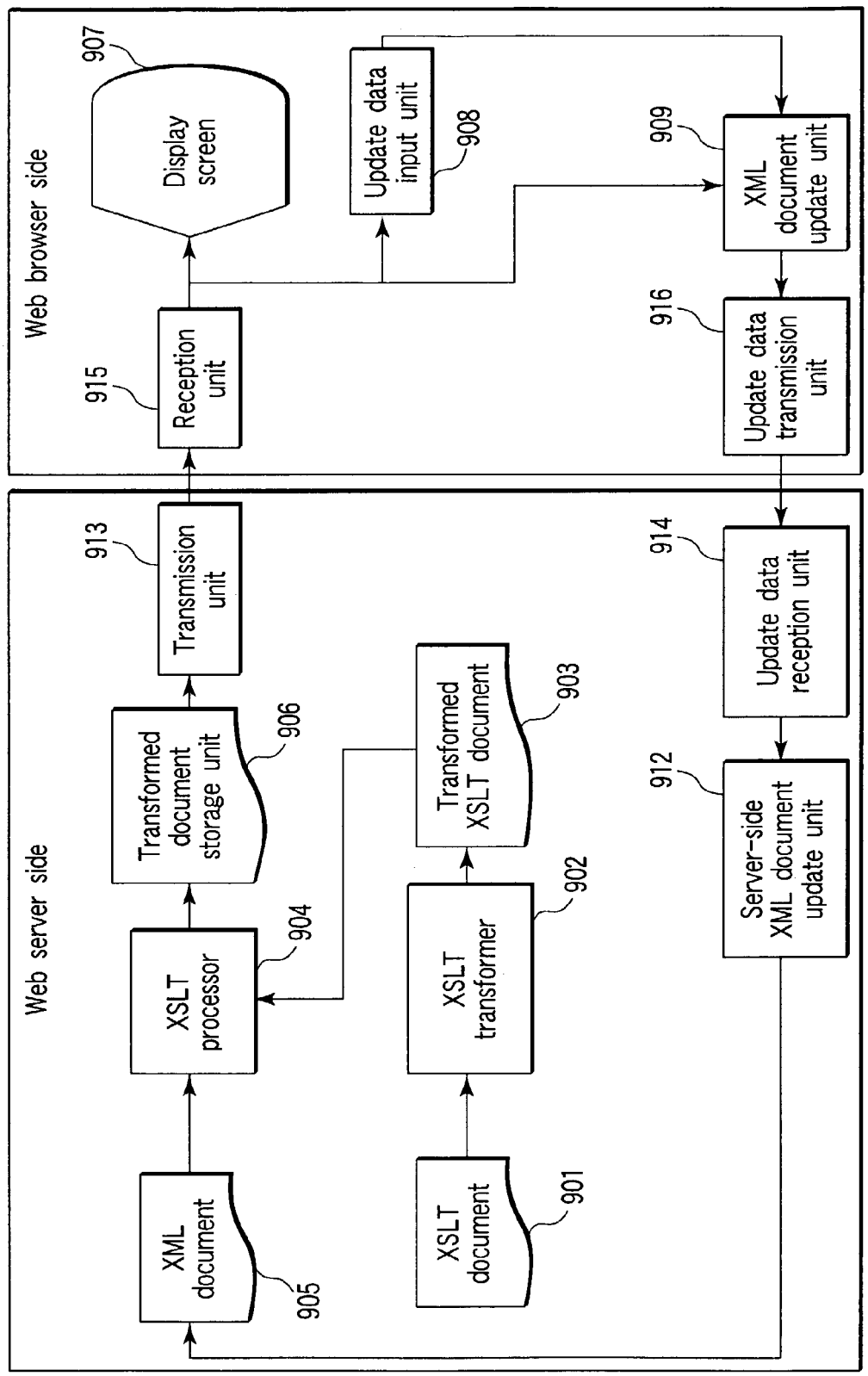
FIG. 6 is a functional block diagram showing another example of the configuration of the XML document edit apparatus according to the embodiment of the present invention.

FIG. 6 shows another example of the configuration of the XML document edit apparatus (structured document edit apparatus) according to this embodiment. FIG. 6 shows an example of a configuration when the XSLT processor is arranged in the computer (1 in FIG. 1) in which the Web server is arranged, although the configuration in FIG. 6 has the same basic functions as those in the example of the configuration shown in FIG. 5.

In FIG. 6, the XSLT processor 904, XSLT transformer 902, and transformed document storage unit 906 are arranged on the Web server (11 in FIG. 1) side, and the display device 907, update data input unit 908, and XML document update unit 909 are arranged on the Web browser (21 in FIG. 1) side. Also, a server-side XML document update unit 912 is arranged on the Web server side.

Furthermore, a transmission unit 913 and update data reception unit 914, and a reception unit 915 and update data transmission unit 916 are respectively arranged on the Web server side and the Web browser side, and data are exchanged using these units.

In this case, a transformed document is generated on the Web server side, and data associated with this transformed document is temporarily stored in the transformed document storage unit 906. The stored data is then transferred to the display device 907, update data input unit 908, or XML document update unit 909 on the Web browser side via the transmission unit 913 on the Web server side and the reception unit 915 on the Web browser side.

The XML document update unit 909 on the Web browser side generates update information (e.g., information that designates nodes to be updated in the source XML document, information that designates update contents {e.g., addition or deletion of a node, change of a node value, and the like}, and so forth) indicating the update contents of the source XML document in accordance with an input from the update data input unit 908.

The generated update information is transferred from the XML document update unit 909 to the server-side XML document update unit 912 via the update data transmission unit 916 on the Web browser side and the update data reception unit 914 on the server side.

The server-side XML document update unit 912 updates the source XML document in accordance with the received update information.

In FIG. 6, a browser-side transformed document storage unit may be connected to the output side of the reception unit 915 on the Web browser side. In this case, data associated with the transformed document may be transferred from the transformed document storage unit 906 on the Web server side to the browser-side transformed document storage unit via the transmission unit 913 on the Web server side and the reception unit 915 on the Web browser side, and may be stored in that storage unit. After that, the stored data may be transferred from the browser-side transformed document storage unit to the display device 907, update data input unit 908, or XML document update unit 909 on the Web browser side by the same method as in FIG. 5.

(Data Structure of Transformed Document Storage Unit)

An example of the data structure stored in the transformed document storage unit 906 in this embodiment will be explained below.

Figure 7:
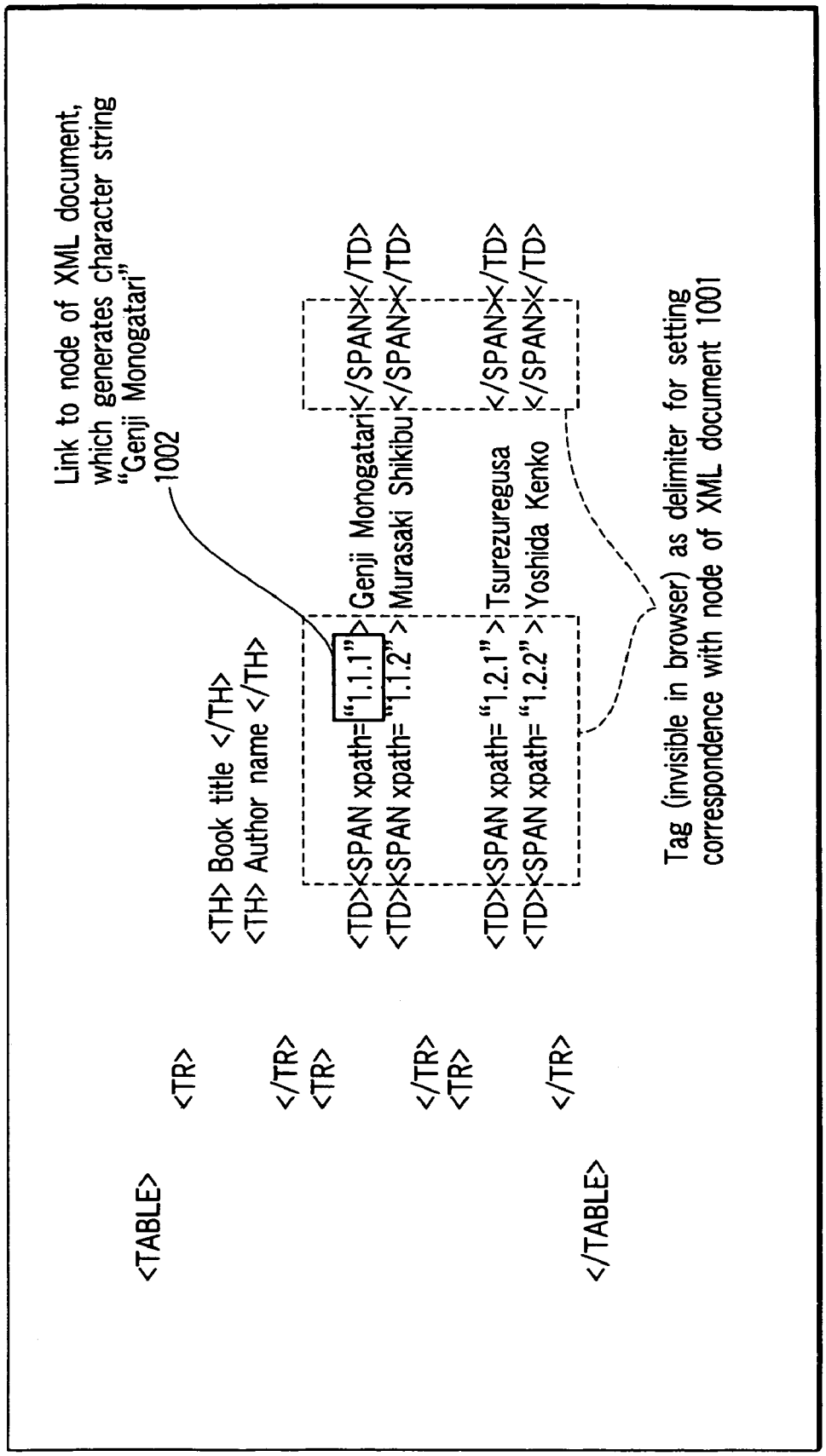
FIG. 7 shows an example of data to be generated by an XSLT processor of the XML document edit apparatus according to the embodiment of the present invention.

The transformed document storage unit 906 holds data used to generate a screen display on the display device 907, and data used to refer to nodes in the source XML document 905 from screen building components. FIG. 7 shows an example of data recorded in this transformed document storage unit 906. FIG. 7 shows an example obtained when the XML document in FIG. 2 and the XSLT document in FIG. 3 are processed, and one HTML document forms whole data (that is, an HTML document having links to source XML document nodes). Note that FIG. 7 shows substantially the same structure as in FIG. 44, except for portions bounded by broken lines 1001.

The portions bounded by the broken lines 1001 in FIG. 7 distinguish text parts generated from nodes in the XML document from other text parts, and also hold links (1002) to nodes in the source XML document 905. Also, the portions bounded by the broken lines 1001 store correspondence between the nodes in the HTML document and those in the source XML document, and specify correspondence between screen building components on the display device 907 and the nodes in the source XML document.

Each link to a node in the source XML document may use a method of encoding a value obtained by counting the number of nodes in the XML document, a method using XPath, and the like. A part "1.1.1" bounded by a solid line 1002 in FIG. 7 corresponds to the former example, and is a character string generated by coupling count values of nodes in the source XML document for respective layers via periods ".". For example, "1.2.1" means a link to a text node (Tsuredureguса) in the first child node (<title>) of the second child node (second <book>) of the first node (<booklist>) in the first layer in the source XML document.

Assume that a tag <SPAN> in FIG. 7 is a tag which is invisible in the Web browser 21. The structure in FIG. 7 is substantially the same as that in FIG. 44, except for the portions bounded by the broken lines 1001, which use tags <SPAN> which are invisible in the Web browser 21. Hence, the HTML document in FIG. 7 has the same or substantially the same appearance as that of the HTML document in FIG. 44 in the Web browser 21 (see FIG. 4).

As the storage method of links to nodes in the source XML document, a method of appending links as HTML comments may be used in addition to the aforementioned method using tags and attribute values.

Figure 8:
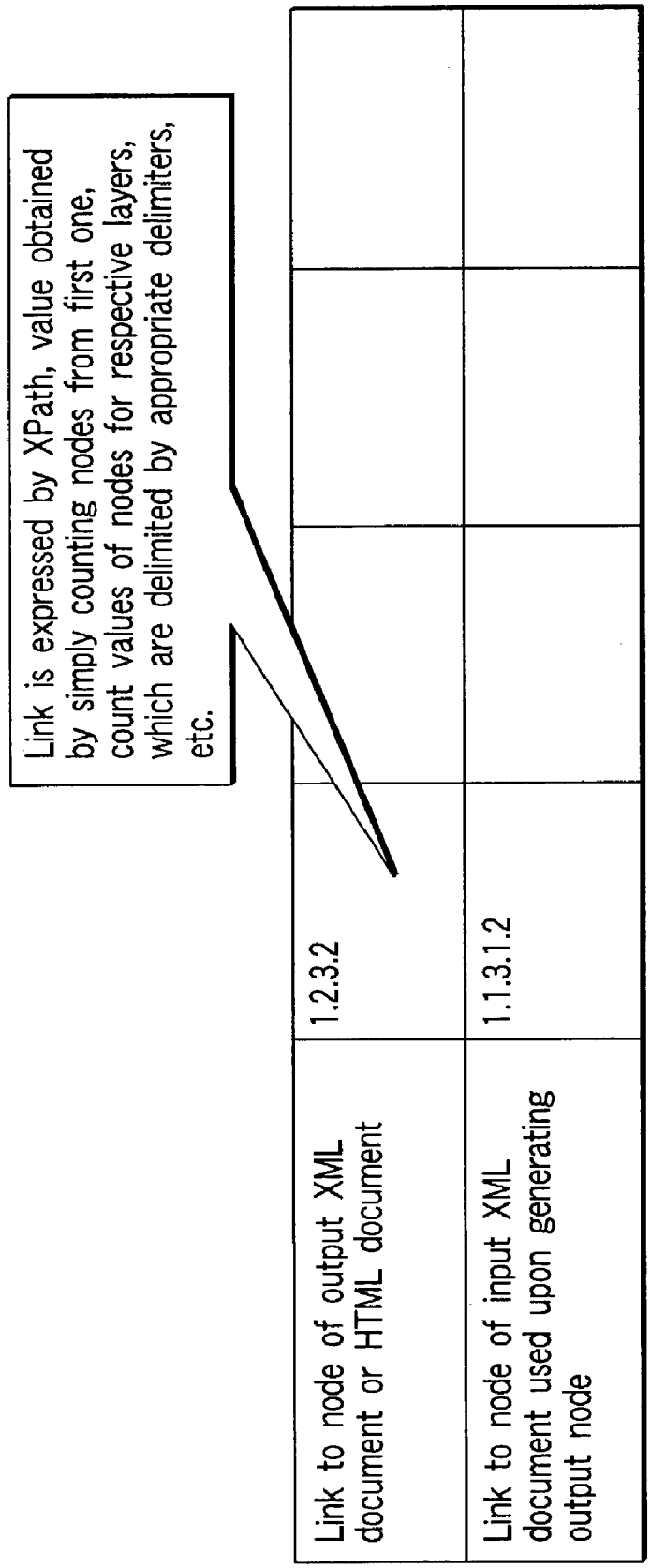
FIG. 8 shows an example of an XML document node correspondence table.
Figure 9:
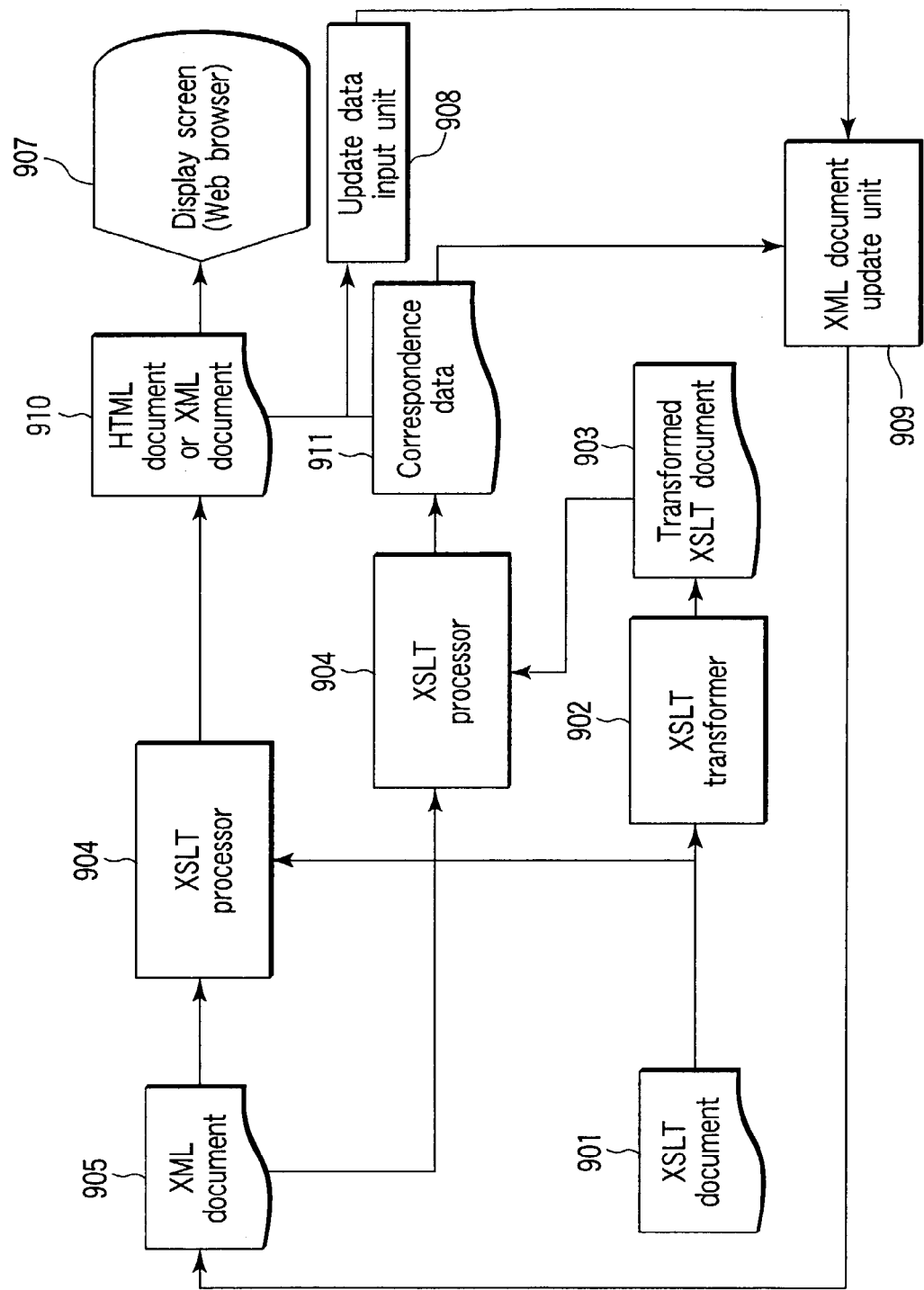
FIG. 9 is a functional block diagram showing still another example of the configuration of the XML document edit apparatus according to the embodiment of the present invention.

As another storage method, a method of adding a functional block that stores links to nodes in the source XML document independently of an HTML document (e.g., FIG. 44) to be passed to the display device 907 in place of embedding these links in the HTML document is available. The data structure in this case may use a method of using data equivalent to FIG. 7, a method of holding correspondence using a table shown in FIG. 8, and the like. FIG. 9 shows an example of the configuration of an XML document edit apparatus when link information (correspondence data) is stored in another functional block. Compared to the example of the configuration of FIG. 5, two XSLT processors are prepared. One of these processors generates an HTML document 910 to be passed to the display device 907, and the other generates correspondence data 911. Note that the two XSLT processors are prepared in FIG. 9. Alternatively, only one XSLT processor may be prepared, and may be commonly used to generate the above two data (that is, two XSLT processors are not always required on a program in practice, and two data, i.e., an HTML document to be passed to the display device, and correspondence data, need only be obtained from a pair of XML and XSLT documents). Of course, in case of FIG. 9 as well, a configuration in which an XSLT processor is arranged in the computer (1 in FIG. 1) in which the Web server is arranged is available, as described earlier with reference to FIG. 6.

(Structure of Transformed XSLT)

An example of the structure of the transformed XSLT document 903 will be explained below.

The transformed XSLT document 903 itself complies with the XSLT standards, and is generated by replacing some commands in the XSLT document 901 by other commands by the XSLT transformer 902.

The data structure of the XSLT document and the operation of the XSLT processor 904 will be explained below (they basically comply with the standards specified by W3C).

Figure 10:
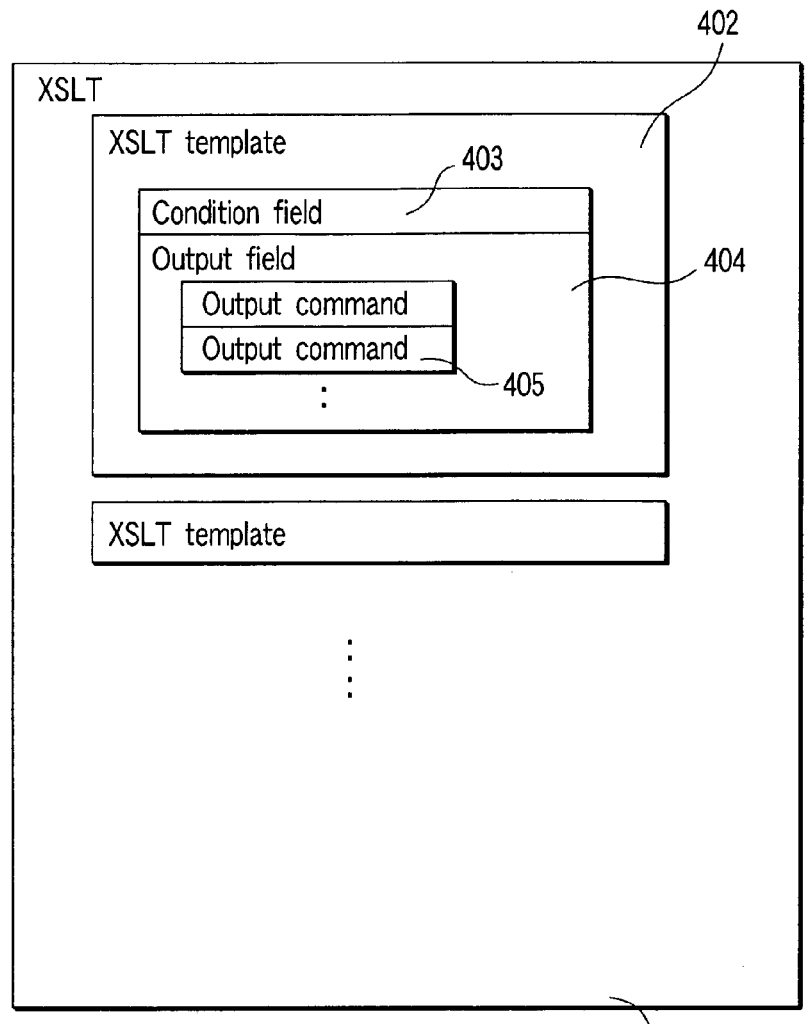
FIG. 10 shows a configuration example of the data structure of an XSLT document.

FIG. 10 shows a configuration example of the data structure of the XSLT document.

An XSLT document 401 is formed of a set of one or more XSLT templates 402. Each XSLT template 402 is formed of a condition field 403 and output field 404. The output field 404 is formed of a set of zero or more output commands 405.

The XSLT processor 904 checks nodes in the input XML document 905 in turn to examine if each node conforms to the condition field of each XSLT template. If a given node conforms to the condition field, a node of a predetermined structured document (HTML document in this example) such as an XML document, HTML document, or the like is added to an output in accordance with the output commands in the output field. The XSLT processor 904 repeats the aforementioned sequence until it checks all nodes in the XML document 905.

XSLT output commands include a command for outputting the text value of a node in the input XML document 905. This command will be referred to as a "node value output command" hereinafter. An example of such XSLT command is xsl:value-of (501 in FIG. 3) or the like.

Figure 11:
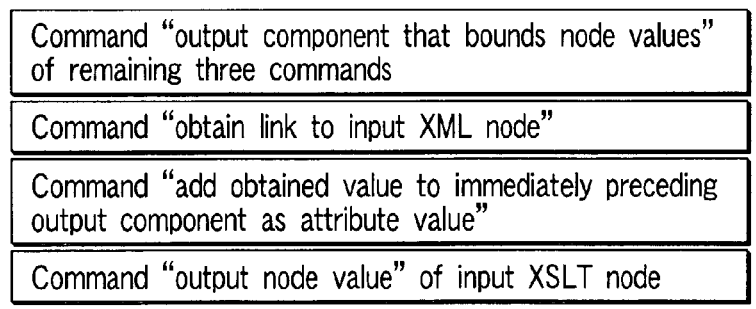
FIG. 11 shows a configuration example of a series of commands used to replace a node value output command.

The XSLT transformer 902 replaces the aforementioned node value output command of output commands of the input XSLT document 901 by a series of commands. FIG. 11 shows a configuration example of a series of commands used to replace the node value output command.

FIG. 12 shows an example of the transformed XSLT document 903. This example is obtained by transforming the XSLT document in FIG. 3 by the XSLT transformer 902. Note that FIG. 13 partially shows the document in FIG. 12 in an enlarged scale, and portions corresponding to four different transformation commands in FIG. 11 are bounded by broken lines.

Figure 13:
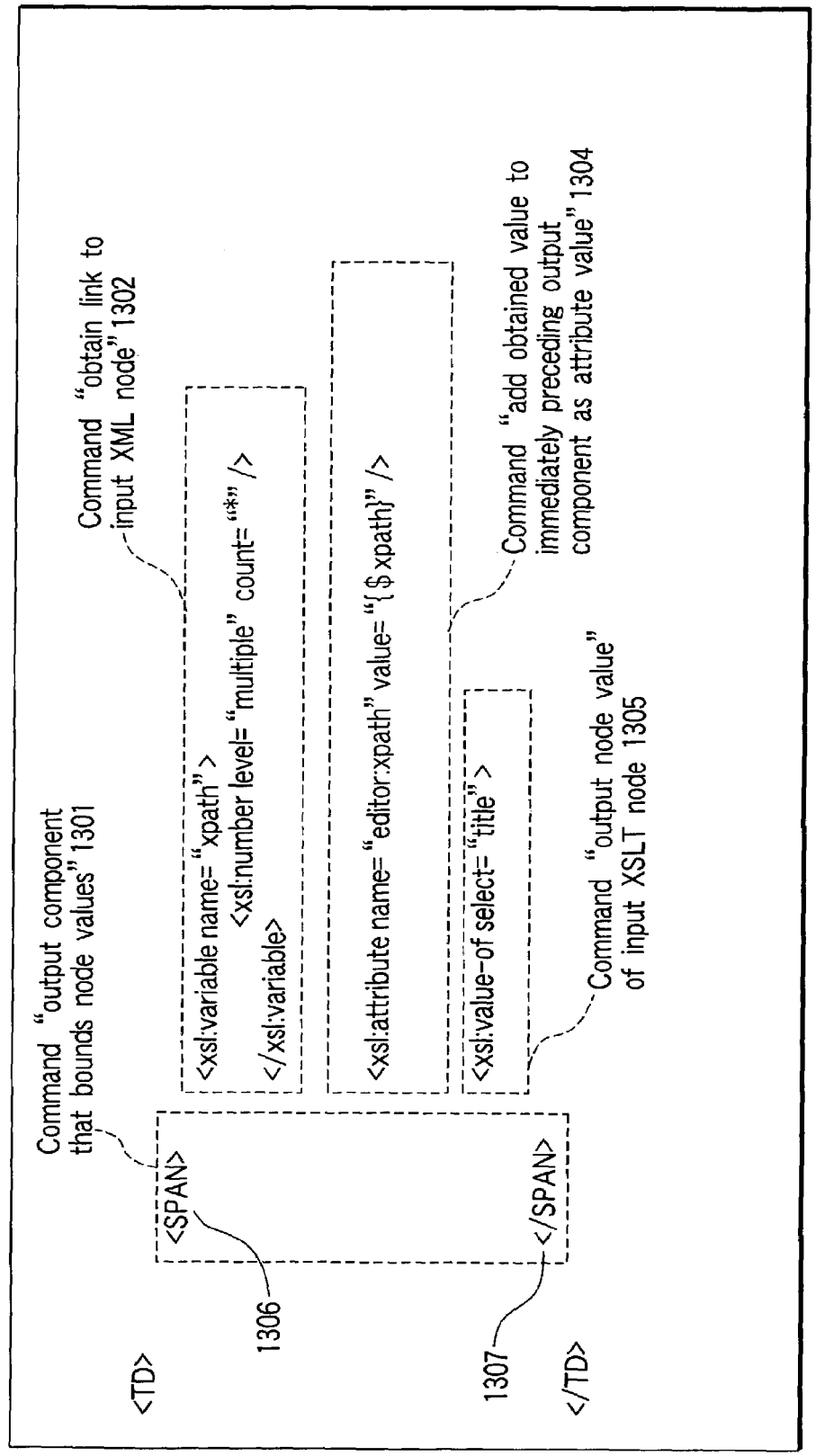
FIG. 13 shows another example of a transformed XSLT document.

A series of commands to be replaced in FIG. 11 will be explained below using the examples shown in FIGS. 12 and 13.

In FIG. 11, a command "output a component that bounds node values" of the remaining three commands is used to indicate that a replaced command group is information as one cluster on the output HTML document (FIG. 7). More specifically, this command bounds nodes output by the remaining three commands by specific HTML tags. In the example in FIG. 13, nodes in the output HTML document are bounded by <SPAN> tags.

A command "obtain a link to an input XML node" is used to obtain a link to a node in the XML document 905 whose process is in progress. More specifically, this command includes xsl:number as a command that counts nodes in the XML document 905 whose process is in progress from the first one, and an xsl:variable command that substitutes the count value of the former command in a variable to allow the next command to refer to that value.

A command "add an obtained value to an immediately preceding output component as an attribute value" includes an xsl:attribute command that appends the value obtained by the command "obtain a link to an input XML node" to <SPAN> tags generated by the command "output a component that bounds node values" as an attribute value.

A command "output a node value" of an input XSLT node is as described above.

Figure 14:
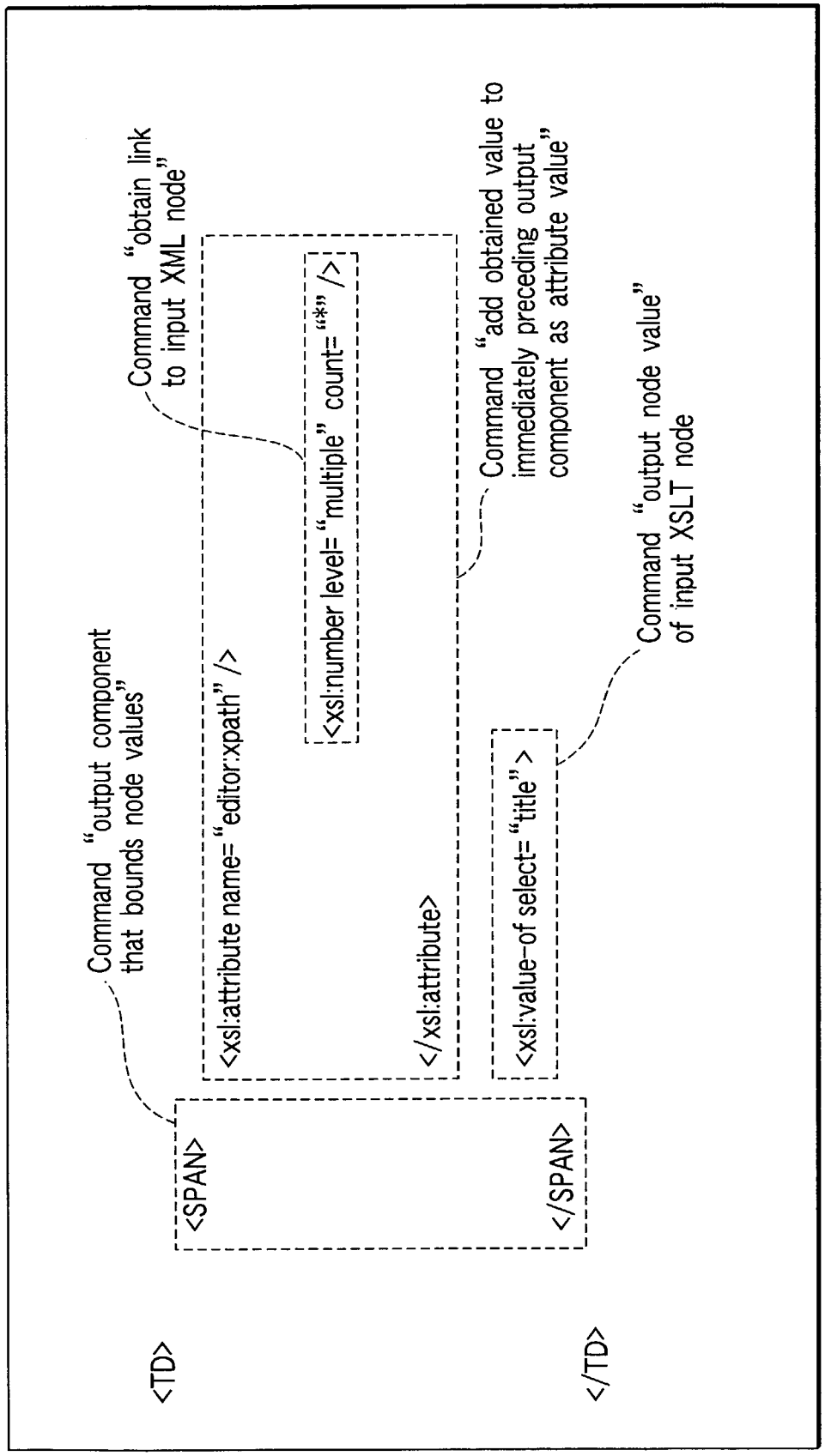
FIG. 14 shows still another example of a transformed XSLT document.

Note that various description methods of the transformed XSLT document 903 are available in addition to the aforementioned one. FIG. 14 shows an example in which the transformed XSLT document 903 is described without using xsl:variable. In case of this example, the command "obtain a link to an input XML node" is embedded in the command "add an obtained value to an immediately preceding output component as an attribute value".

The operation of this embodiment will be described in more detail below.

(Transformation Sequence in XSLT Transformer)

The XSLT transformer 902 of the XML document edit apparatus shown in FIG. 5 will be described below.

Figure 15:
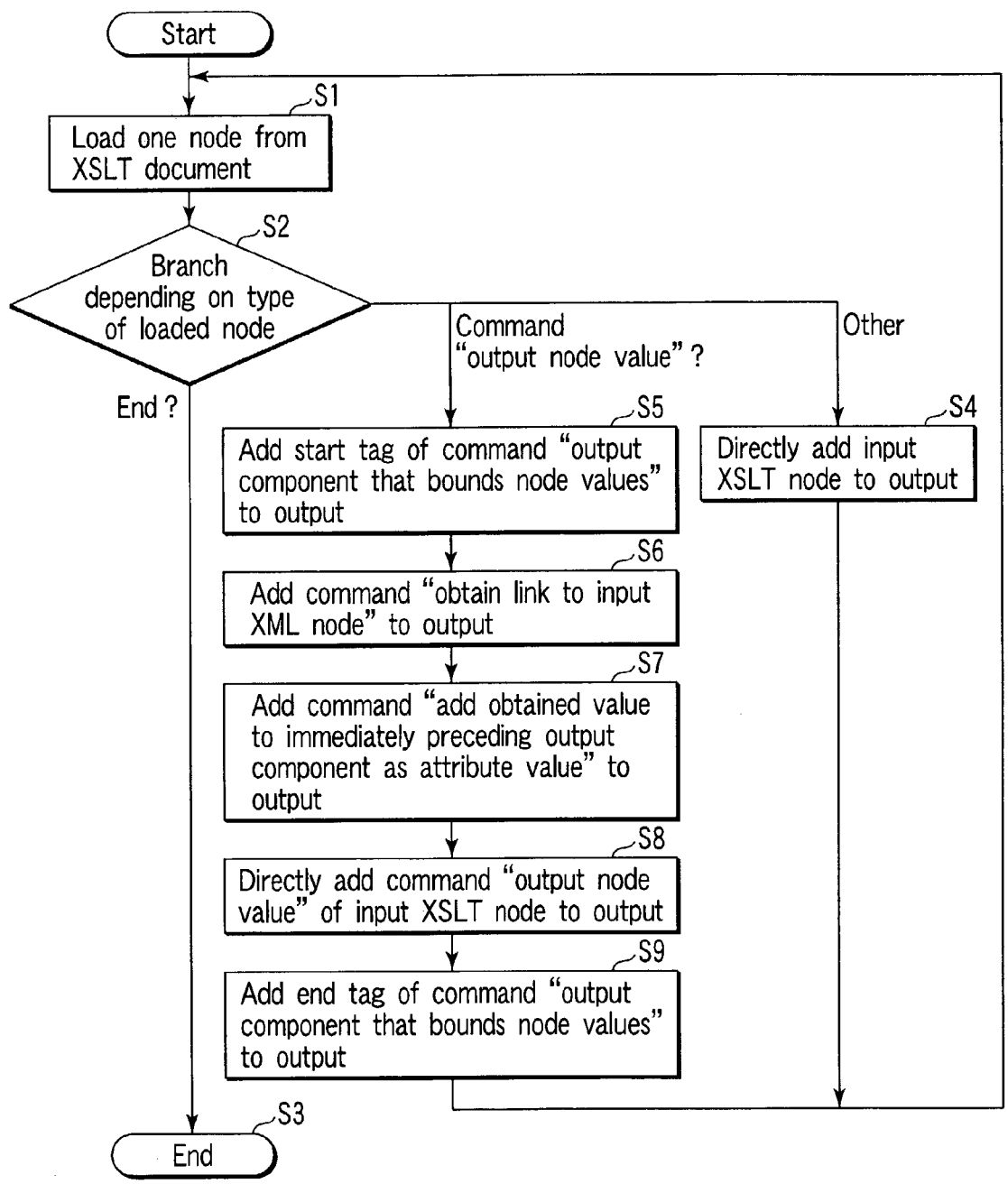
FIG. 15 is a flowchart showing an example of the processing sequence of an XSLT transformer of the XML document edit apparatus according to the embodiment of the present invention.

FIG. 15 shows an example of the transformation sequence of the XSLT transformer 902.

More specifically, the XSLT transformer 902 receives the XSLT document 901, executes the sequence shown in FIG. 15, outputs the transformed XSLT document 903, and passes it as an XSLT document to the XSLT processor 904.

In this sequence, the XSLT transformer 902 loads one of nodes from the input XSLT document 901 (step S1).

Subsequently, the flow branches depending on the type of the loaded node (step S2). As a result, if the XSLT document 901 has no more nodes to be loaded, the process ends (step S3).

If it is determined in step S2 that the type of node is not a command "output a node value", the XSLT transformer 902 adds the input node to an output without any modification (step S4). The flow returns to step S1 to repeat the process for loading the next node in the XSLT document 901.

On the other hand, if it is determined in step S2 that the type of node is a command "output a node value", the XSLT transformer 902 adds commands which replace the node value output command, as shown in, e.g., FIG. 12, to the output in place of the command "output a node value" (steps S5 to S9).

The processes in steps S5 to S9 will be described in detail below using the example of FIG. 13.

That is, if the type of node is a command "output a node value" (see 501 in FIG. 3), the XSLT transformer 902 adds a start tag (1306) of the command "output a component that bounds node values" (1301) to the output (step S5).

Then, the XSLT transformer 902 adds the command "obtain a link to an input XML node" (1302) to the output (step S6).

The XSLT transformer 902 adds the command "add an obtained value to an immediately preceding output component as an attribute value" (1304) to the output (step S7).

The XSLT transformer 902 directly adds the input command "output a node value" (1305) to the output (step S8).

Finally, the XSLT transformer 902 adds an end tag (1307) of the command "output a component that bounds node values" (1301) to the output (step S9).

After the commands shown in FIG. 12 are added to the output in place of the command "output a node value" in steps S5 to S9, the flow returns to step S1 to process the next node in the XSLT document.

(Sequence for Receiving Input Data and Updating XML Document)

The sequence executed when the update data input unit 908 and XML document update unit 909 of the XML document edit apparatus in FIG. 5 receive input update data and update the source XML document 905 in the Web browser 21 will be explained below.

A case will be exemplified below wherein the data shown in FIG. 2 is used as the XML document 905, and the data shown in FIG. 3 is used as the XSLT document 901.

The display device 907 receives data shown in, e.g., FIG. 7 from the transformed document storage unit 906 as the output of the XSLT processor 904, and displays a screen shown in FIG. 4.

The update data input unit 908 is set in advance to receive a notification using an event function or the like of the Web browser 21, when a display is clicked by a mouse.

When the operator clicks a character string on the screen, e.g., a character string "Murasaki Shikibu" in FIG. 4, the Web browser 21 notifies the update data input unit 908 of this click.

Upon receiving that notification, the update data input unit 908 searches for a node of an HTML document (FIG. 7), which is located under the mouse pointer, and has a link to a node in the transformed XML document 905.

If no such node hits, the unit 908 waits for the next event without any process.

If the corresponding node hits, the update data input unit 908 displays a text box, text area, or the like of the Web browser 21 on the node in the HTML document, sets the current value of the node in the HTML document in that box or area, and accepts an update data input from the operator. FIG. 16 shows an example of a screen used to accept a text input "Murasaki Shikibu" when the HTML document shown in FIG. 7 is displayed.

The XML document update unit 909 updates the corresponding node in the corresponding source XML document 905 by text input to the text box or the like displayed by the update data input unit 908.

(Another Transformation Sequence in XSLT Transformer)

As another example of the transformation sequence in the XSLT transformer 902 of this embodiment, the sequence for adding a link to a node in the source XML document in case of a command "output a non-XSLT component" in addition to links used so far will be explained below using an example of the XML document shown in FIG. 2, and that of the XSLT document shown in FIG. 3.

Note that the command "output a non-XSLT component" of XSLT commands indicates <TR>, <TD>, <TABLE>, and <TH> in the XSLT document example in FIG. 3, and is used to add homonymous tags.

Figure 17:
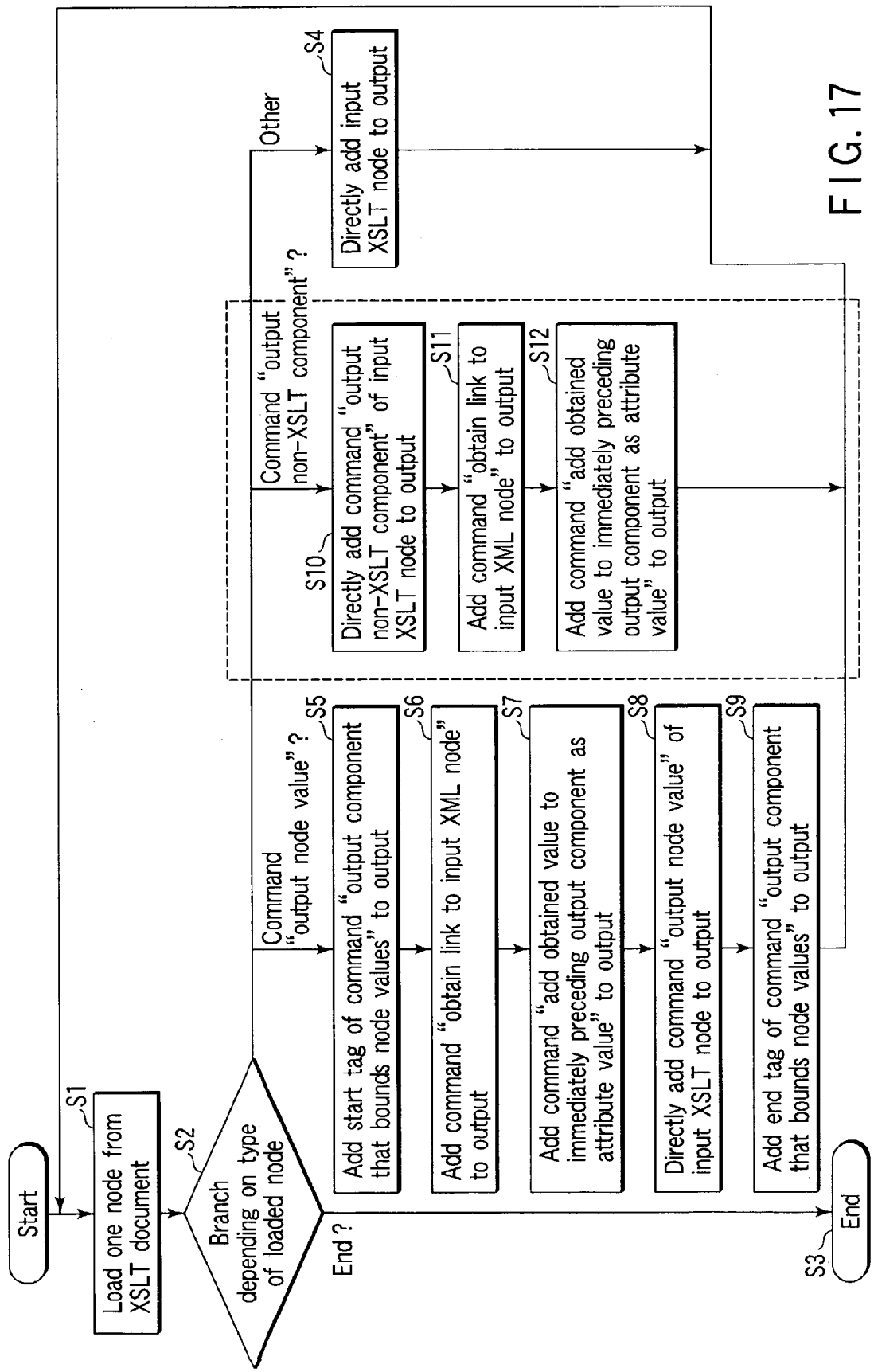
FIG. 17 is a flowchart showing another example of the processing sequence of the XSLT transformer of the XML document edit apparatus according to the embodiment of the present invention.

FIG. 17 shows another example of the transformation sequence of the XSLT transformer 902.

FIG. 18 shows an example of an XSLT document obtained by transforming the XSLT document shown in FIG. 3 by the XSLT transformer 902 in accordance with the sequence shown in FIG. 17 (excerption of some contents). FIG. 19 shows an example of data (in this case, an HTML document) in the transformed document storage unit 906, which are output from the XSLT processor 904 on the basis of the XML document example in FIG. 2 and the transformed XSLT document example in FIG. 18.

The sequence in FIG. 17 is different from that in FIG. 15 in that when the type of node is a command "output a non-XSLT component" in step S2 in the sequence in FIG. 15, portions bounded by the broken lines in FIG. 18 are added and output in place of simply outputting a command. For example, if a <TR> tag is found (step S2), the <TR> tag itself is output (step S10), as indicated by 2101 in FIG. 18. Then, the command "obtain a link to an input XML node" is added to the output (step S11), and the command "add an obtained value to an immediately preceding output component as an attribute value" is added to the output (step S12). In this way, commands are added, as indicated by, e.g., 2102 in FIG. 18. The control then returns to the process for searching for the next node in the XSLT document 901.

In this manner, portions (2102, 2104, 2106) bounded by the broken lines in FIG. 18 are those added to FIG. 12, i.e., new commands added in this sequence. With these commands, data in portions bounded by the broken lines in FIG. 19 are added (the portions bounded by the broken lines in FIG. 19 are those added to the transformed XSLT document in FIG. 7).

In FIG. 19, the portions bounded by the broken lines are data added to the transformed XSLT document in FIG. 7, and links to nodes in the source XML document 905 used upon generating these output nodes are added.

When the operator copies or deletes a node appended with a link to such node in the Web browser 21, the XML document update unit 909 copies or deletes the corresponding node in the XML document 905 indicated by that link.

(XSLT Style Edit Sequence)

The processes for reflecting the results of edit processes done on a screen to the source XML document while holding correspondence between the screen image and nodes of the source XML document have been explained. Likewise, processes for reflecting the results of edit processes of style information (e.g., a font size, font type, table width, text color, and the like) done on a screen to the source XSLT document while holding correspondence between the screen image and nodes of the source XSLT document can also be implemented.

The sequence in which links to be held in the transformed document storage unit 906 are replaced by those to nodes in the source XSLT document before transformation by modifying the sequence of the XSLT transformer 902 of the XML document edit apparatus in FIG. 5 will be explained below. Furthermore, the sequence for editing the table width, font, and the like by editing the XSLT document 901 in the Web browser 21 using these links will be explained.

In this case, the XML document edit apparatus in FIG. 5 can comprise an XSLT document update unit in addition to or in place of the XML document update unit 909. Also, the example of the configuration that has been explained with reference to FIG. 6 can comprise an XSLT document update unit (on the Web browser side) and a server-side XSLT document update unit (on the Web server side) in addition to or in place of the XML document update unit 909 and server-side XML document update unit 912.

In the sequence for adding links to nodes in the XSLT document to the transformed document storage unit 906 in the XSLT transformer 902, the command "obtain a link to an input XML node" in the flowchart in FIG. 15 or 17 is replaced by the command "obtain a link to an input XML node".

FIG. 20 shows an example of a transformed XSLT document which is output in the aforementioned sequence, and FIG. 21 shows an example of data (only differences from FIG. 12) in the transformed document storage unit 906, which are output from the XSLT processor 904 on the basis of this transformed XSLT document. Note that portions (2301 to 2305) bounded by the broken lines in FIG. 20 are those different from FIG. 18.

For example, in FIG. 21, a link "1.1.1" embedded in a <TR> tag (2202) represents that this tag is output based on a <TR> tag in the XSLT document in FIG. 3.

The sequence for allowing the operator to add a style attribute to a designated screen component in the Web browser 21 using these links to nodes in the XSLT document will be explained below using an example. For example, when the operator inputs an instruction for changing a table component color to red from the update data input unit 908 in the Web browser 21, the XSLT document update unit searches for a node (2201) in the corresponding HTML document. The XSLT document update unit then searches for a <TABLE> tag in the XSLT document in FIG. 3 using a link "1.2.1" to a node in the XSLT document, which is embedded in that node (2201) in the HTML document. The XSLT document update unit adds a style attribute value "style="color:red"" input at the update data input unit 908 to the <TABLE> tag in the XSLT document, thereby changing a table color to red.

Furthermore, by repeating a series of transformation processes to update a display on the screen, the display on the screen is updated, and the table color changes to red.

(Sequence of XSLT Debug Function)

The function of editing the XML document and XSLT document has been explained. Likewise, a function of holding correspondence between the screen image and templates in the source XSLT document, and aiding debugging of the XSLT document by searching for an XSLT template can also be implemented.

The sequence for holding links to templates in the XSLT document 901 in the transformed document storage unit 906 will be explained below by modifying the sequence of the XSLT transformer 902 of the XML document edit apparatus in FIG. 5. Furthermore, the sequence of the function of aiding debugging of the XSLT document by searching for an XSLT template in the XSLT document used in transformation using the links to templates in the XSLT document will be explained using an example.

In this case, the XML document edit apparatus in FIG. 5 can comprise an XSLT debug processor in addition to the XML document update unit 909 and/or the XSLT document update unit or in place of the XML document update unit 909 and XSLT document update unit. Also, the example of the configuration that has been explained with reference to FIG. 6 can comprise an XSLT debug processor (on the Web browser side) and a server-side XSLT debug processor in addition to or in place of the XML document update unit 909/server-side XML document update unit 912 and/or the XSLT document update unit/server-side XSLT document update unit.

Figure 22:
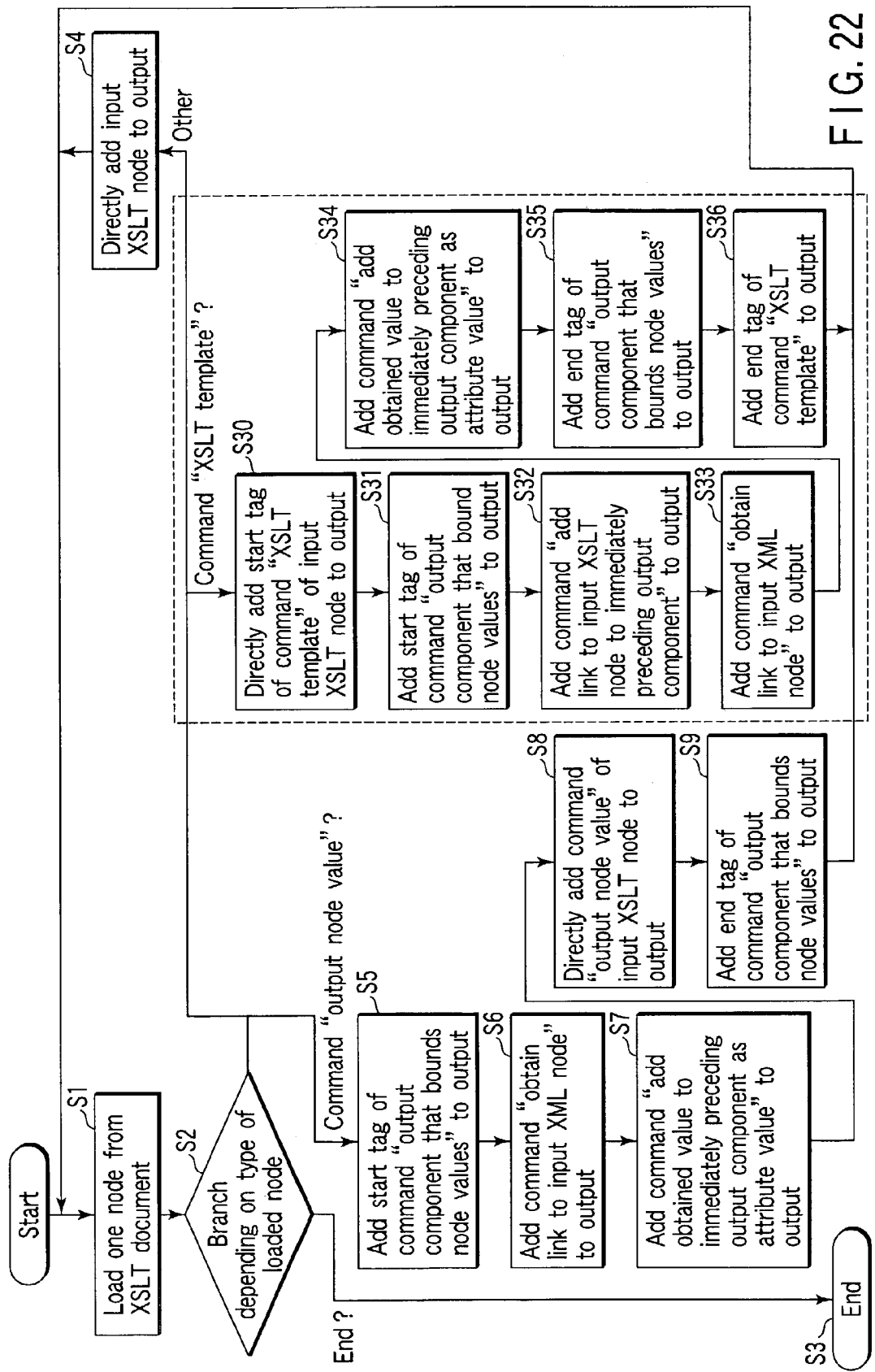
FIG. 22 is a flowchart showing still another example of the processing sequence of the XSLT transformer of the XML document edit apparatus according to the embodiment of the present invention.

FIG. 22 shows an example of the processing sequence of the XSLT transformer 902 when links to templates in the XSLT document 901 are held in the transformed document storage unit 906. In FIG. 22, steps bounded by the broken line are those different from the sequence in FIG. 15.

FIG. 23 shows an example of a transformed XSLT document, which is output in this sequence (excerption of some contents). Portions (2502 to 2506) bounded by the broken lines in FIG. 23 are those different from the XSLT document example of FIG. 12, which is generated in the sequence of FIG. 15.

Figure 24:
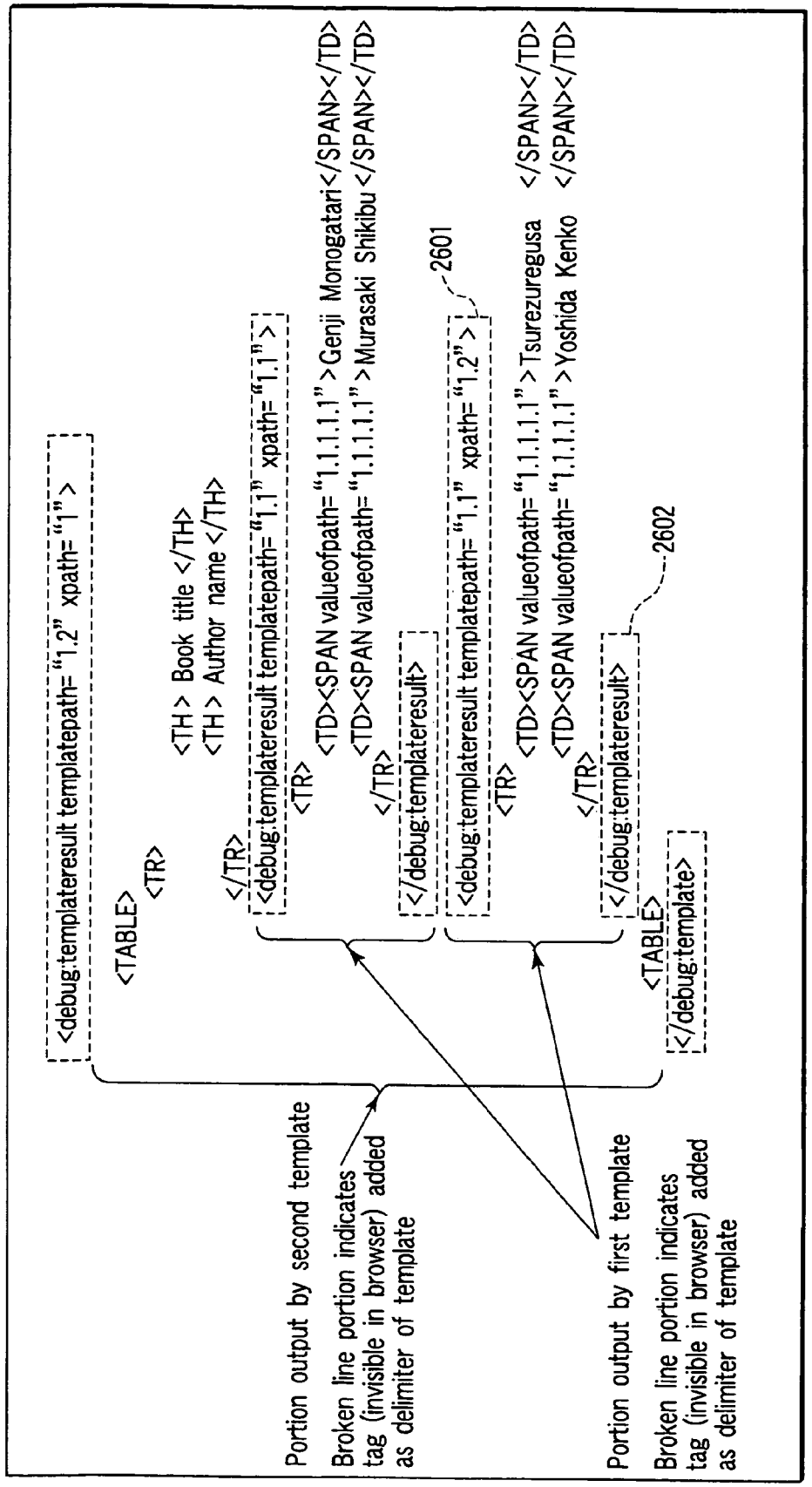
FIG. 24 shows an example of data to be generated by the XSLT processor of the XML document edit apparatus according to the embodiment of the present invention.

FIG. 24 shows an example of data in the transformed document storage unit 906, which are output from the XSLT processor 904 on the basis of the transformed XSLT document in FIG. 23.

For example, a portion 2601 in FIG. 24 is an example in which "templatepath="1.1"" refers to the first XSLT template in the XSLT document in FIG. 3, and "xpath="1.2"" refers to the second <book> node in the XML document in FIG. 2.

A set of a start tag 2601 and an end tag 2602 indicate that a portion bounded by these tags is generated with reference to the second <book> node in the XML document in FIG. 2 and the first XSLT template in the XSLT document in FIG. 3.

The steps bounded by the broken line in FIG. 22 will be explained below.

More specifically, after an XSLT node is loaded (step S1), if the loaded node is a command "XSLT template" (step S2), a start tag (2501) of the "XSLT template" command is added to an output (step S30). In this case, an attribute contained in the start tag is directly added to the output. Note that the command "XSLT template" indicates an <xsl:template> node in this example.

Then, a start tag (2502) of the command "output a component that bounds node values" is added to the output (step S31). More specifically, a tag such as <debug:templateresult> in another XML name space is added.

Furthermore, the command "add a link to an input XSLT node to an immediately preceding output component" (2503) is added to the output (step S32). This command generates, e.g., "templatepath="1.1"" indicated by 2601 in FIG. 24.

The command "obtain a link to an input XML node" (2504) and command "add an obtained value to an immediately preceding output component as an attribute value" (2505) are added to the output (steps S33 and S34). With these commands, for example, "xpath="1.2"" indicated by 2601 in FIG. 24 is generated.

Then, an end tag (2506) of the command "output a component that bounds node values" is added to the output (step 35). This command generates, e.g., an end tag indicated by 2602 in FIG. 24.

Finally, an end tag (2507) of the command "XSLT template" is added to the output (step S36).

The data in the transformed document storage unit 906 in this example, which are generated in this way, have the same or substantially the same appearance as those in FIG. 4 in the Web browser 21, when they are displayed on the display device 907.

An example using the links to XSLT templates will be explained below. FIG. 25 shows a display example of the debug function using the links. This display example is displayed when a specific displayed character string (e.g., "Yoshida Kenko") in data held in the transformed document storage unit 906 is clicked using a mouse.

A screen display of this example will be explained. This screen display indicates that a text node "Yoshida Kenko" is generated since a node 2703 in an XML document is applied to an XSLT template 2701. Also, this screen display indicates that the XSLT template 2701 is called from an <xsl:apply-templates> command in an XSLT template 2702. Furthermore, this screen display indicates that a node 2704 in the XML document is applied to the XSLT template 2702.

The operation sequence after this click until the display in FIG. 25 is obtained will be explained below.

If the operator has clicked a specific character string in the Web browser 21, the HTML document is searched for a node corresponding to the mouse position, and then for a node whose parent node holds a link to a template in the XSLT document. In this example, the HTML document is searched for a node which holds a templatepath attribute.

A template in the XSLT document, which corresponds to the found link is extracted from the XSLT document 901, and is displayed on the display device 907. Furthermore, a link to a node in the XML document is extracted. In this example, the value of an xpath attribute is extracted from the node having the templatepath attribute. A node corresponding to a link to this node in the XML document is extracted from the XML document, and is displayed on the display device 907.

By repeating the aforementioned process until all processes are complete for a root node, the display shown in FIG. 25 is obtained.

(Combination)

(1) Links to nodes in the XML document, (2) links to nodes in the XSLT document, and (3) links to XSLT templates described above may be independently embedded, or two arbitrary or three different types of links may be embedded in combination.

Upon embedding such links in combination, a mechanism for determining a function to which an operator's operation such as node click or the like is assigned is preferably added.

As one of simple methods, switching may be used. As this method, a method of switching using tool buttons, a method of switching based on whether or not a shift key of a keyboard is held down, a method of switching using a context menu displayed by a right button, and the like may be used.

Alternatively, a plurality of independent windows such as a tool pallet and the like may be prepared on the screen, and an operation menu, text input box, and the like corresponding to a node selected on the screen are displayed on independent windows at the same time, thus obviating the need for switching.

When the XSLT debug function uses links to XSLT templates and those to nodes in the XSLT document in combination, a call command that calls a given template may be indicated by bounding it by a frame line or highlighting it. Note that the command that calls a template indicates, e.g., an <xsl:apply-templates> tag or the like.

(Example of Configuration that Adds Edit Function Corresponding to Node of XSLT document)

In the above description, the XSLT transformer 902 adds fixed functions. Alternatively, a method of externally controlling functions to be added by the XSLT transformer 902 as a definition document may be used. Note that the function is used to, e.g., update an XML document based on an input at a text box or a candidate selected from a selection box.

An example of the configuration that controls a function added by the XSLT transformer 902 using a definition document will be explained below.

(Configuration Including Definition Document)

Figure 26:
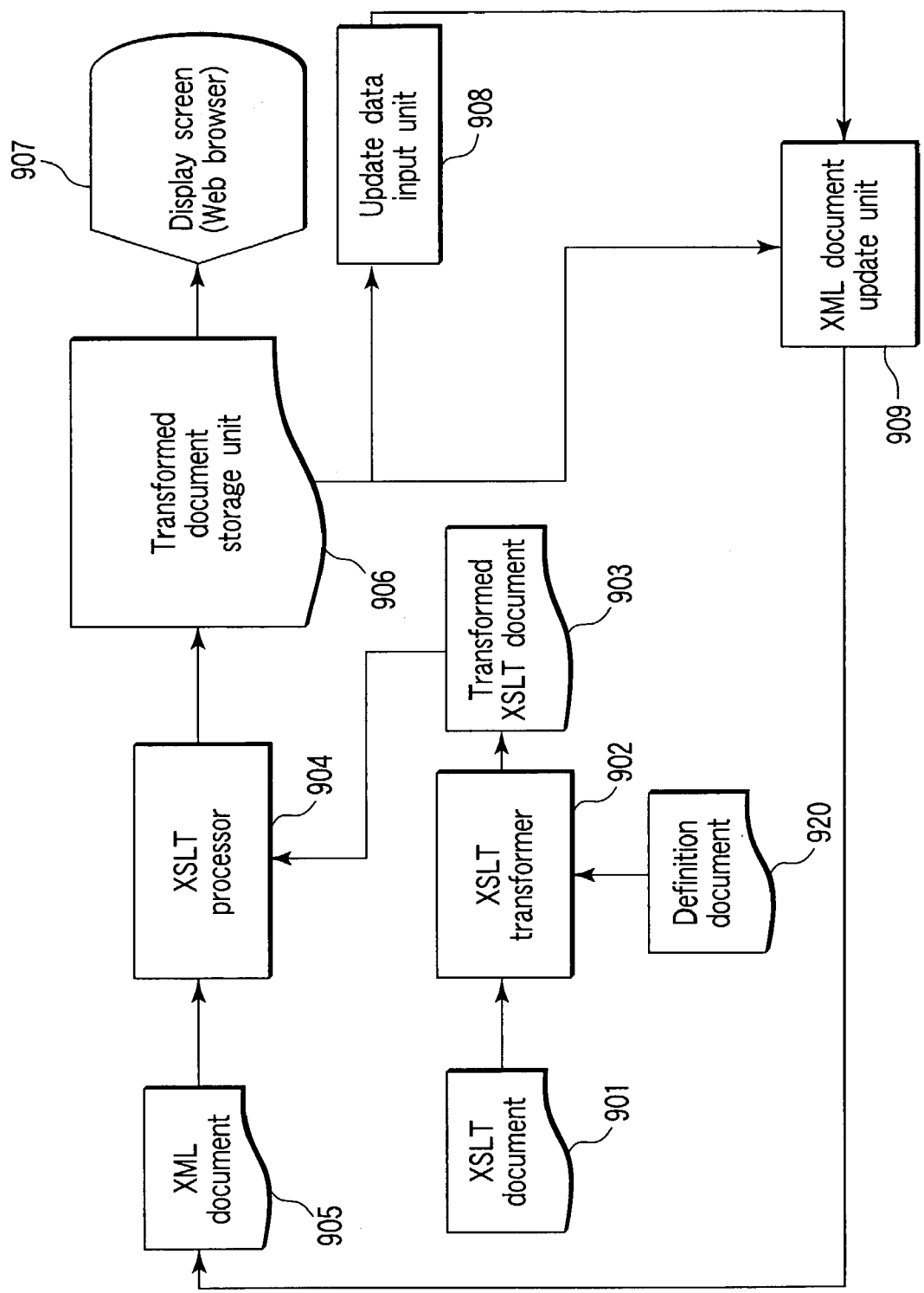
FIG. 26 is a functional block diagram showing still another example of the configuration of the XML document edit apparatus according to the embodiment of the present invention.

FIG. 26 shows an example of the configuration of an XML document edit apparatus (structured document edit apparatus) which controls the XSLT transformer 902 using a definition document.

As shown in FIG. 26, a definition document 920 is added to the configuration shown in FIG. 5. The XSLT transformer 902 in FIG. 26 receives the XSLT document 901 and definition document 920.

The definition document 920 designates "function" added by the XSLT transformer 902, and "location" where the function is to be added. The definition document 920 is input to the XSLT transformer 902.

The XSLT transformer 902 transforms the input XSLT document 901 in accordance with the description of the input definition document 920. The transformed XSLT document 902 is then passed to the XSLT processor 904. The XSLT processor 904 transforms the XML document 905 using the transformed XSLT document 903, thus generating a transformed document.

The update data input unit 908 is used to input update data in the Web browser 21. For example, the unit 908 is implemented by a script, text input boxes, and the like in the Web browser 21.

The XML document update unit 909 is implemented by, e.g., a script and the like in the Web browser 21. The unit 909 has a function of receiving links to nodes in the source XML document from the transformed document storage unit 906, and input data from the update data input unit 908, and updating the source XML document 905 on the Web server.

Of course, in case of FIG. 26 as well, an example of the configuration in which the XSLT processor is arranged in the computer (1 in FIG. 1) in which the Web server is arranged, is available, as has been explained previously with reference to FIG. 6.

(Structure of Definition Document)

The data structure of the definition document 920 will be described below.

Figure 27:
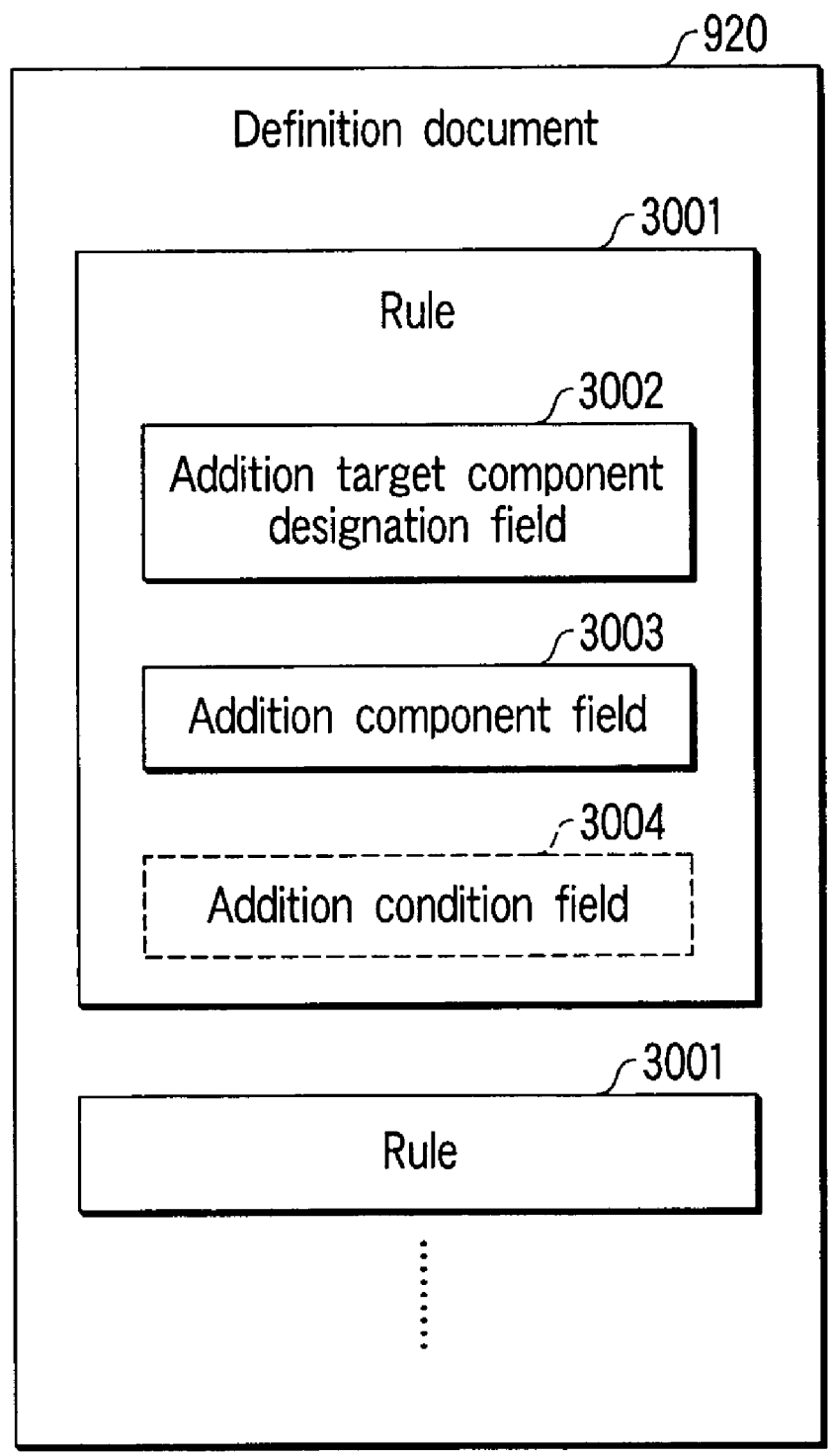
FIG. 27 shows a configuration example of the data structure of a definition document.

FIG. 27 shows a schematic configuration example of the data structure of the definition document 920.

As shown in FIG. 27, the definition document 920 is made up of one or a plurality of rules 3001. Each rule includes an addition target component designation field 3002 that indicates "location" where a function is to be added, and an addition component field 3003 that indicates "function" to be added.

The addition target component designation field 3002 designates a node position of the XSLT document 901 to be transformed. Designation of the node position is described using, e.g., an Xpath formula or the like.

The addition component field 3003 designates a function to be added to the node position designated by the addition target component designation field 3002.

Also, each rule 3001 may include an addition condition field 3004 that describes a condition required upon adding a function.

With the aforementioned configuration, node positions and functions to be added to these node positions in the XSLT document 901 are described in the definition document.

FIG. 28 shows an example of the definition document 920.

The broken lines in FIG. 28 correspond to the building components of the definition document shown in FIG. 27. In this example, two rules 3001 are defined. In FIG. 28, the first rule describes to add an input function by means of a text box to a node position in the XSLT document designated by an XPath formula described in a match attribute. The second rule describes to add an input function by means of a selection box to a node position in the XSLT document designated by an XPath formula described in a match attribute.

The first rule includes the addition condition field 3004, and designates a condition required upon adding the function. If the addition condition field is present, the designated function is added only when the condition of the addition condition field is met.

(Transformed XSLT Structure)

An example of the structure of the transformed XSLT document 903 will be explained below.

FIG. 29 shows an example of the transformed XSLT document 903.

This example is obtained by transforming the XSLT document in FIG. 3 by the XSLT transformer 902 using the definition document in FIG. 28. Portions bounded by the broken lines in FIG. 29 are those transformed by the XSLT transformer 902 according to the description of the definition document. Note that FIGS. 30 and 31 show only portions transformed from the XSLT document in FIG. 3, which are extracted from the XSLT document in FIG. 29. FIG. 30 corresponds to a portion 3010 in FIG. 29, and FIG. 31 corresponds to a portion 3011.

How to reflect the description of the definition document to the transformed XSLT document will be explained below using the examples shown in FIGS. 28 to 31.

The XSLT transformer 902 adds designated functions to locations designated in respective rules (3001) of the definition document 920.

The transformed XSLT document 903 (FIG. 29) is obtained by replacing components of the XSLT document 901 designated by the addition target component designation fields (3002) of the definition document 920 (FIG. 28) by those designated by the addition component designation parts (3003).

As described above, the portions bounded by the broken lines in FIG. 29 are the transformed portions, and details of these portions are respectively shown in FIGS. 30 and 31.

The first rule of the definition document 920 will be explained first.

FIG. 30 shows a portion which is replaced by the first rule of the definition document 920 and adds an input function by means of a text box.

Since the first rule of the definition document in FIG. 28 includes the condition field (3004), a condition is checked.

Then, components (below an <xsl:when> tag in FIG. 29) to be processed when the condition is met, and a portion (below an <xsl:otherwise> tag in FIG. 29) that implements a process originally described in the XSLT document when the condition is not met, are output.

When the condition is met, an input function by means of a text box is added according to the description of the rule. More specifically, as a child component of the component that checks the condition, a <textarea> component, and an XSLT command that embeds a link to the source XML document 905 in that component are inserted. In this example, since an <xsl:value-of> command that extracts the value of the XML document is inserted, when the XML document is transformed using this transformed XSLT document, the value of the target XML document is extracted as in the case wherein the XML document is transformed using the XSLT document before transformation.

The second rule of the definition document 920 will be described below.

FIG. 31 shows a portion which is replaced by the second rule of the definition document 920 and adds an input function by means of a selection box.

Since the second rule does not include any condition field, no component that checks a condition is output.

According to the description of the rule, an input function by means of a selection box is added. More specifically, a <select> component, a component that embeds a link to the source XML document 905 as an attribute, an <option> component used to display candidates in the selection box, and a command that selects a candidate based on a value of the XML document are inserted.

(Structure of Transformed Document)

An example of the structure of the transformed document obtained by transforming the XML document 901 using the transformed XSLT document 903 will be explained below.

FIG. 32 shows an example of the transformed document. This example is obtained by transforming the XML document in FIG. 2 by the XSLT processor 904 using the transformed XSLT document in FIG. 29.

The XSLT processor 904 transforms the XML document 901 in accordance with commands of the XSLT document.

In the transformed XSLT document 903, commands are added or changed with respect to the source XSLT document 901 in accordance with the description of the definition document 920. When the added/changed portions are interpreted by the XSLT processor 904, functions according to the description of the definition document 920 can be added to the transformed document.

In the transformed document in FIG. 32, portions indicated by the broken lines are those added with functions. A portion (3020) that implements input using a text box, and a portion (3021) that implements input using a selection box are respectively generated from commands in the portions (3010, 3011) bounded by the broken lines in the transformed XSLT document 903 in FIG. 29.

In the portion that adds the input function using the text box, a <TEXTAREA> tag in which a link to the source XML document 905 is added as an attribute is inserted according to the commands of the transformed XSLT document 903.

In the portion that implements input using the selection box, a <SELECT> tag in which a link to the source XML document 905 is inserted as an attribute, and an <OPTION> tag used to display selection candidates are inserted according to the commands of the transformed XSLT document 903.

Since the portions bounded by the broken lines in the transformed XSLT document 903 in FIG. 29 are generated according to the description of the definition document 920 in FIG. 28, as described above, functions are consequently added to the transformed document according to the description of the definition document 920.

Figure 33:
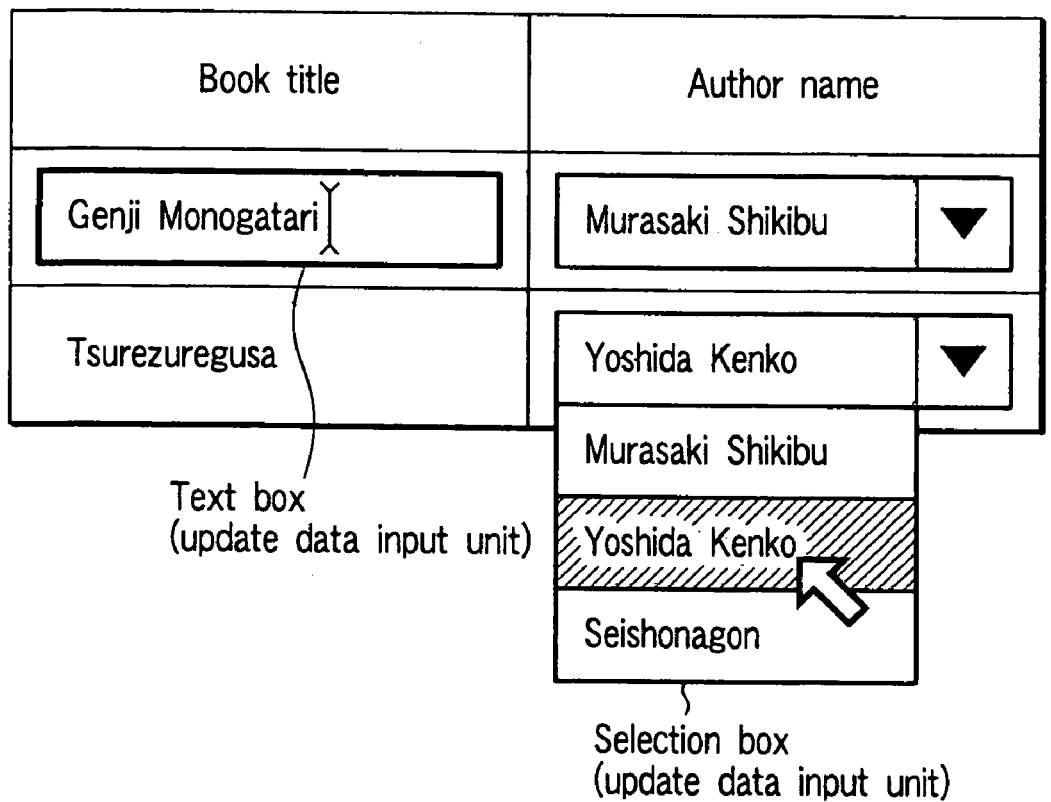
FIG. 33 shows an example of a display screen with which the update data input unit of the XML document edit apparatus according to the embodiment of the present invention receives a data input in a browser.

FIG. 33 shows an example of a screen when the generation result document in FIG. 32 is displayed in a browser. Compared to the display in FIG. 4, functions are added.

(Transformation Sequence in XSLT Transformer)

Figure 34:
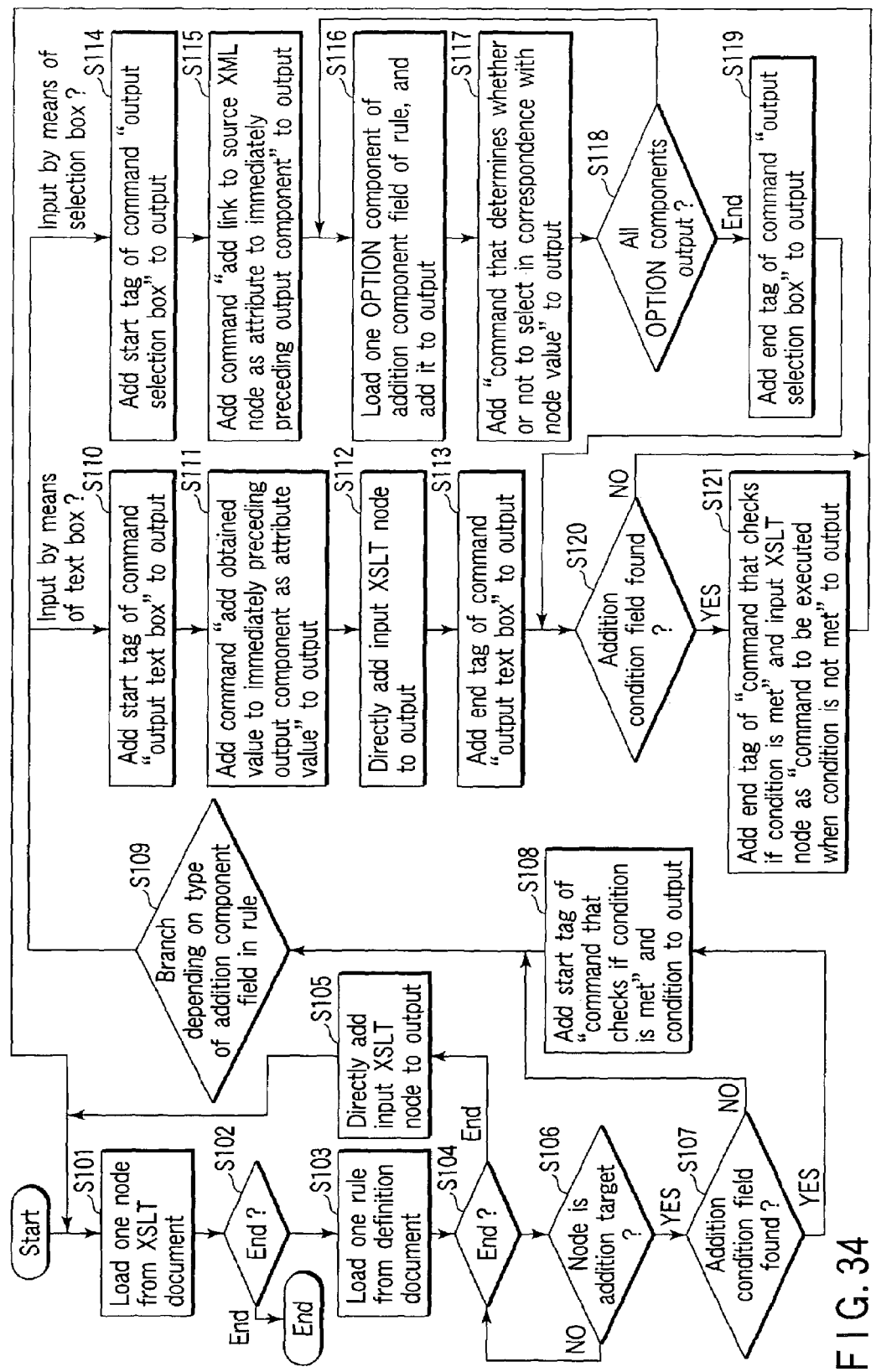
FIG. 34 is a flowchart showing still another example of the processing sequence of the XSLT transformer of the XML document edit apparatus according to the embodiment of the present invention.

FIG. 34 shows an example of the transformation sequence of the XSLT transformer 902 in this case.

That is, the XSLT transformer 902 receives the XSLT document 901 and definition document 920, executes the sequence shown in FIG. 34, outputs the transformed XSLT document 903, and passes it as an XSLT document to the XSLT processor 904.

In this sequence example, the XSLT transformer 902 loads one of nodes from the input XSLT document 901 (step S101).

As a result, if the XSLT document 901 has no more nodes to be loaded (step S102), the process ends.

Subsequently, the XSLT transformer 902 loads one of rules from the input definition document 920 (step S103).

As a result, if the input definition document 920 has no more rules to be loaded (step S104), the XSLT transformer 902 directly outputs the loaded node (step S105), and the flow returns to step S101.

On the other hand, if the XSLT transformer 902 can load one node from the XSLT document 901 and can load one rule from the definition document 920, it compares the loaded node with the addition target component designation field of the loaded rule to see if that node is an addition target (step S106).

As a result, if the loaded node is not an addition target, the flow returns to step S104.

If the loaded node is an addition target, the XSLT transformer 902 checks if the rule contains the addition condition field (step S107). If the addition condition field is found, the XSLT transformer 902 outputs a start tag of a command "check a condition held by an addition condition field" and a conditional statement (step S108). If no addition condition field is found, the XSLT transformer 902 skips the process in step S108.

Then, the flow branches depending on the type of addition component field in the loaded rule (step S109).

In this example, since input using a text box and that using a selection box are assumed as the types of addition component fields, the flow branches depending on whether the type of addition component field is input using a text box or that using a selection box.

In case of input using a text box, processes of corresponding components are executed in steps S110 to S113. In case of input using a selection box, processes of corresponding components are executed in steps S114 to S119.

Since the processes in steps S110 to S113 in case of input using a text box are substantially the same as those in steps S5 to S9 in the sequence example of the XSLT transformer 902 in FIG. 15, a description thereof will be omitted.

The processes in steps S114 to S119 in case of input using a selection box will be explained below.

In this case, the XSLT transformer 902 adds a start tag of a command "output a selection box" to an output (step S114).

The XSLT transformer 902 adds a command "add a link to a source XML node to an immediately preceding output component as an attribute value" to the output (step S115).

The XSLT transformer 902 then loads one OPTION component in the addition component field in the rule, and adds it to the output (step S116).

The XSLT transformer 902 adds a "command that determines whether or not to select in correspondence with a node value" to the output (step S117).

It is then checked if all OPTION components are added (step S118). If OPTION components to be added still remain, the flow returns to step S116.

On the other hand, if no OPTION component to be added remains, the XSLT transformer 902 adds a command "output a selection box" to the output (step S119).

In this way, the processes when the type of addition component field in the loaded rule is input using a selection box are done.

It is checked again if the rule contains the addition condition field (step S120). If the addition condition field is found, the XSLT transformer 902 outputs an end tag of the command "check a condition held by an addition condition field", and the input XSLT node as a command "to be executed when a condition is not met" (step S121). If no addition condition field is found, the XSLT transformer 902 skips the process in step S121.

The flow returns to step S101 to process the next node of the input XSLT document 901.

When the control leaves the loop in step S102 after the aforementioned processes are repeated, the processing ends.

Of course, by adding processes of other types of addition component fields as the branch destinations of step S109, the number of variations of functions to be added can be increased.

(Example of Configuration that Adds Edit Function Corresponding to Node in XML Document)

The example in which the addition target component designation field in the definition document designates the location in the XSLT document, and an edit function is added to the designated location in the XSLT document has been described. An example of the configuration when an edit function corresponding to the type of a node in the XML document is added by designating the location in the XML document will be explained below.

(Configuration Including Definition Document)

In this case, an example of the configuration that adds an edit function corresponding to the type of node in the XML document is basically the same as that in FIG. 26, and the addition target component designation field in the definition document 920, the structure of the transformed XSLT document, and the sequence of the XSLT transformer 902 need only be modified.

(Structure of Definition Document)

The data structure of the definition document 920 will be described below.

An outline of the data structure is basically the same as that in FIG. 27. The definition document is made up of one or a plurality of rules (3001). Each rule (3001) includes an addition target component designation field (3002) and addition component field (3003).

FIG. 37 shows an example of the definition document 920 in this case.

In FIG. 28, the addition target component designation field designates a node position in the XSLT document.

However, in FIG. 35, a node position in the XML document is designated like "match="author"" and "match="title[position( )=1]"".

In this example, the rules are described to add an input function by means of a text box upon editing a title component in the XML document, and to add an input function by means of a selection box upon editing an author component. This example of the definition document is designed to add the same functions as those on the screen shown in FIG. 33.

Designation of a node position in the XML document is described using, e.g., the XPath formula. In this case, "position( )=1" or the like designated by the addition condition field in FIG. 28 can be contained in the XPath formula of the addition target component designation field. This example designates that only the first one of title components is allowed to be edited using a text box, and other components are not allowed to be edited.

(Transformed XSLT Structure)

The configuration of the transformed XSLT document 903 will be explained below.

FIG. 36 shows an example of the transformed XSLT document 903. This example is obtained by transforming the XSLT document 901 in FIG. 3 by the XSLT transformer 902 using the definition document 920 shown in FIG. 35.

Unlike in the aforementioned configuration example, the structure of the transformed XSLT document 903 is formed of three portions, i.e., a "portion corresponding to templates in the XSLT document" (3030), a "portion obtained by transforming rules in the definition document into XSLT templates" (3031), and a "non-editable default template" (3032).

The "portion corresponding to templates in the XSLT document" (3030) replaces "node value output commands" in the templates of the XSLT document 901 by "template call commands". Note that the "template call command" indicates, e.g., "xsl:apply-templates" or the like.

Upon replacing commands, a select attribute as a node selection part of the node value output command is changed in correspondence with that as a node selection part of the template call command. In this manner, a node value can be transformed and output by a command described in a template corresponding to the node of the XML document in place of directly transforming and outputting it to an HTML document. Also, since a mode attribute is appended to the template call command, a template group to be called is designated to be distinguished from templates corresponding to the XSLT document, and only a template that outputs a node value can be called.

The "portion obtained by transforming rules in the definition document into XSLT templates" (3031), and "non-editable default template" (3032) are templates called by the template call commands. For this purpose, identical mode attributes are designated in these template declarations "xsl:template".

The structure of the "portion obtained by transforming rules in the definition document into XSLT templates" (3031) will be described below.

In the "portion obtained by transforming rules in the definition document into XSLT templates" (3031), the rules in the definition document 920 are transformed into XSLT templates. A match attribute of the addition target component designation field in each rule is substituted in that of the XSLT template declaration. The mode attribute used in the template call is substituted in a mode attribute. In this case, "customize-rule" is substituted in the mode attribute. An output field of a template is replaced by an XSLT command according to a function designated by the addition component field of each rule.

Figures 39, 40:
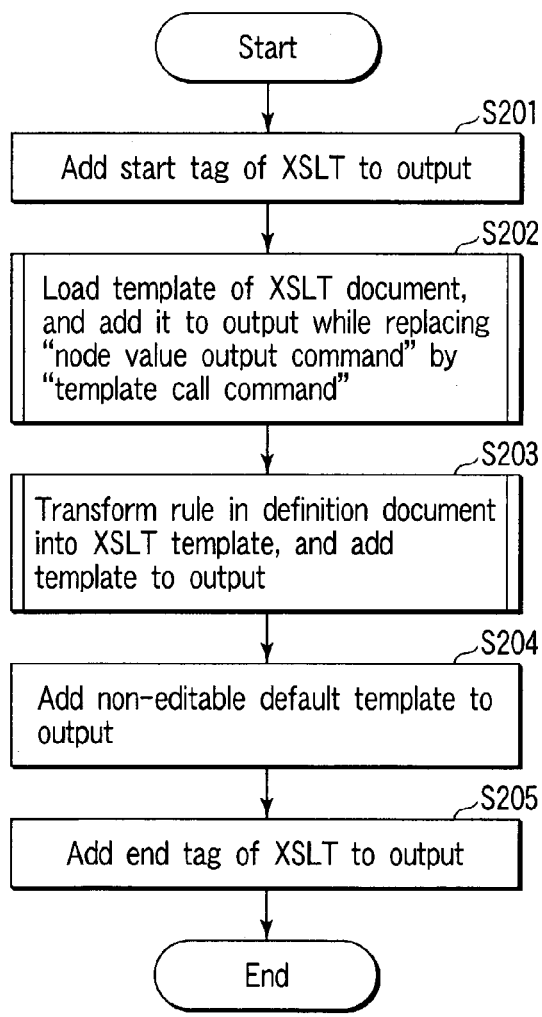
FIG. 39 shows still another example of a transformed XSLT document.
FIG. 40 is a flowchart showing still another example of the processing sequence of the XSLT transformer of the XML document edit apparatus according to the embodiment of the present invention.

FIGS. 37 to 39 show examples of the "portion obtained by transforming rules in the definition document into XSLT templates" (3031).

FIG. 37 shows an example of a template, which is obtained by converting the first rule in the definition document 920 in FIG. 35, and is used to add an input function by means of a text box. This example is called by a template call command obtained by replacing a node value output command in the XSLT document when a title component with position( )=1 is found, and outputs the value of the title component as the value of textarea using a <textarea> component and a link to the source XML document corresponding to that component as attributes.

FIG. 38 shows an example of a template, which is obtained by converting the second rule in the definition document 920 in FIG. 35, and is used to add an input function by means of a selection box. Likewise, this template example is called in place of a node value output command of an author component in the XML document, and embeds the input function using the selection box and a link to the source XML document in place of simply outputting a node value.

FIG. 39 shows an example of a template obtained by transforming a rule in the definition document, which is designated as a non-editable template by the addition component field. This template example simply outputs a node value. Non-editable designation in the definition document is expressed by omitting an addition component field or using a command that indicates non-editable (e.g., a <no-edit> component) or the like.

The "non-editable default template" (3032) is a template which is called when the source document does not match templates obtained by transforming the definition documents. This template example is independent from the XSLT document and definition document, and contains only a command for simply outputting a node value.

The transformed XSLT document 903 in this configuration example has the aforementioned structure. When this transformed XSLT document 903 is interpreted by the XSLT processor 904, it outputs the input function using a text box, input function using a selection box, and the like in accordance with the rules in the definition document 920 in place of outputting node values in the XML document 905.

(Transformation Sequence in XSLT Transformer)

An example of the transformation sequence of this configuration example in the XSLT transformer 902 will be explained below.

Figure 41:
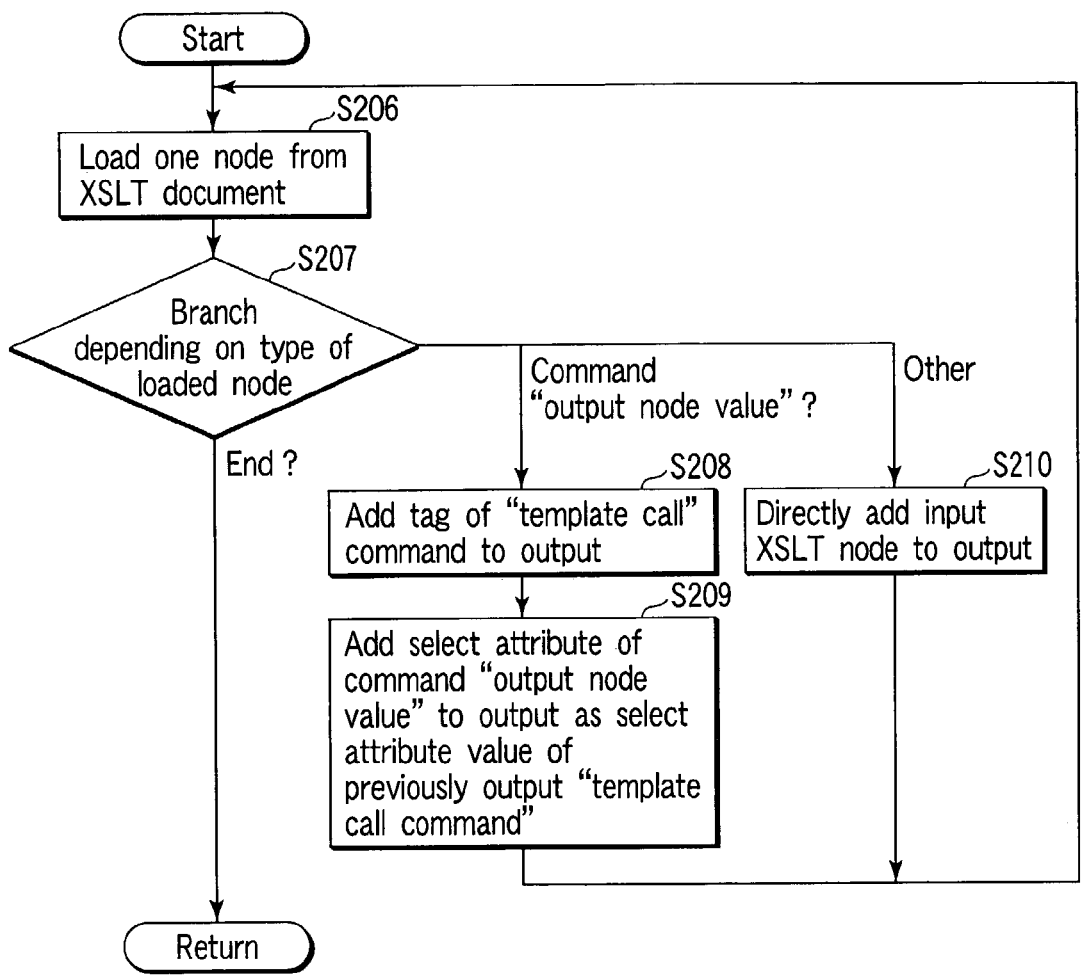
FIG. 41 is a flowchart showing still another example of the processing sequence of the XSLT transformer of the XML document edit apparatus according to the embodiment of the present invention.
Figure 42:
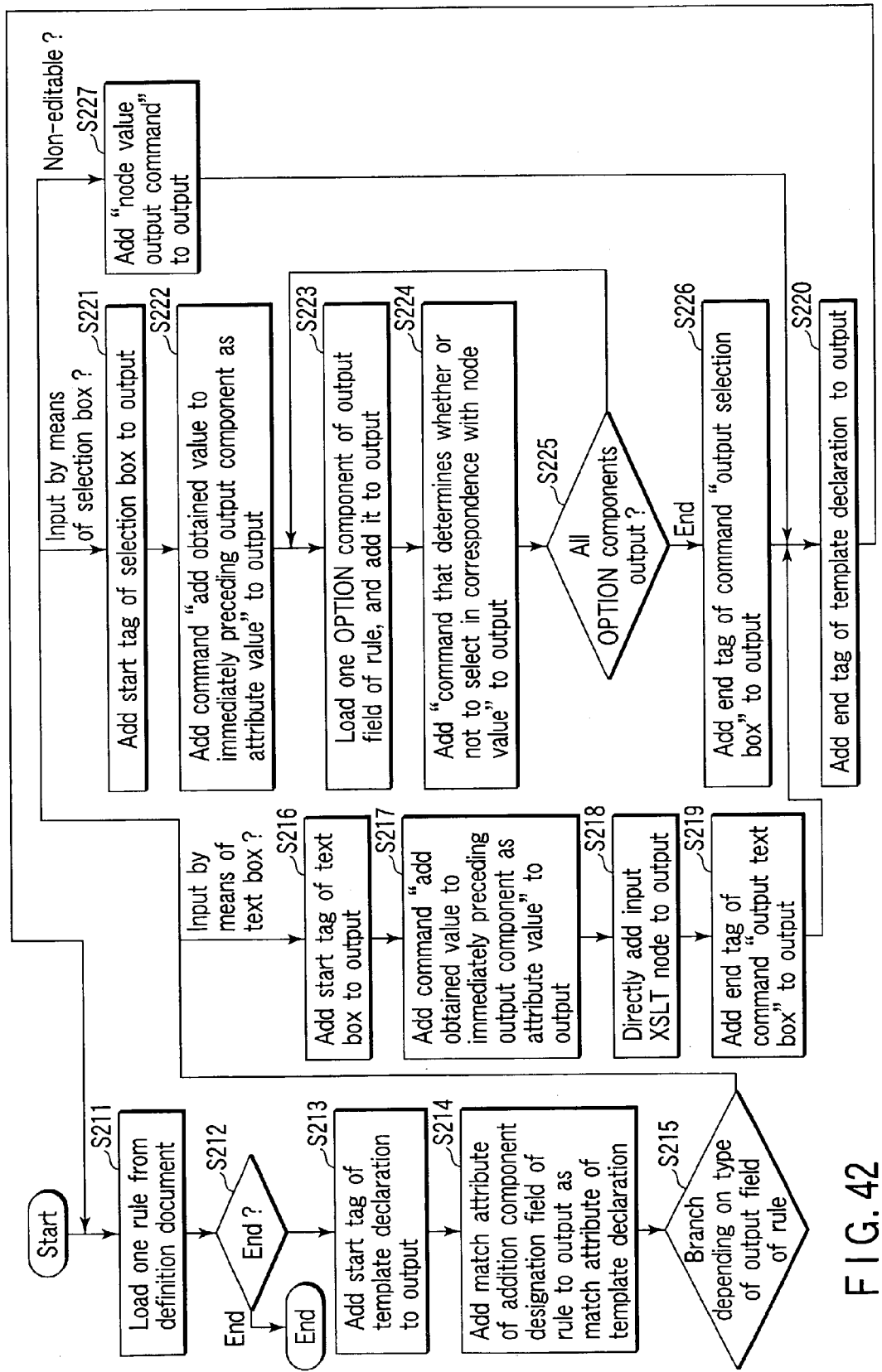
FIG. 42 is a flowchart showing still another example of the processing sequence of the XSLT transformer of the XML document edit apparatus according to the embodiment of the present invention.

FIGS. 40 to 42 show examples of the transformation sequence of the XSLT transformer 902 in this case. That is, the XSLT transformer 902 receives the XSLT document 901 and definition document 920, executes the sequence shown in FIGS. 40 to 42, outputs the transformed XSLT document 903, and passes it as an XSLT document to the XSLT processor 904.

FIG. 40 shows an example of the overall sequence, and FIGS. 41 and 42 show examples of the sequences that explain in steps S202 and S203 in FIG. 40 in more detail.

An outline of the overall sequence shown in FIG. 40 will be explained first, and the sequences in FIGS. 41 and 42 will then be explained.

In this sequence example, the XSLT transformer 902 outputs an XML declaration "<?xml version="1.0"?>" and a start tag of an xsl:stylesheet component in the transformed XSLT document 903 (step S201).

Then, the XSLT transformer 902 loads the XSLT document 901 in accordance with the sequence shown in FIG. 41, and adds templates of the XSLT document to an output (step S202). With this process, the "transformed portion of templates in the XSLT document" (3030) of the transformed XSLT document 903 in FIG. 36 is generated.

Subsequently, the XSLT transformer 902 transforms rules in the input definition document 920 into XSLT templates, and adds them to the output (step S203), in accordance with the sequence in FIG. 42. With this process, the "portion obtained by transforming rules in the definition document into XSLT templates" (3031) of the transformed XSLT document 903 in FIG. 36 is generated.

The XSLT transformer 902 then adds the "non-editable default template" (3032) independently of inputs to the output (step S204).

Finally, the XSLT transformer 902 outputs an end tag of the xsl:stylesheet component (step S205), thus ending the process.

Details of the process in step S202 in FIG. 40 will be described below with reference to FIG. 41.

In step S202, the XSLT transformer 902 adds the templates of the XSLT document to the output. In this case, the transformer 902 replaces "node value output commands" by "template call commands" upon output.

More specifically, the XSLT transformer 902 loads one of nodes from the XSLT document (step S206). If the loaded node is a "node value output command" (step S207), the transformer 902 adds a "template call command" to the output (step S208), and also adds a select attribute of the "node value output command" of the input XSLT document to the output as a select attribute of that template call command (step S209). For example, if the loaded node is "<xsl:value-ofselect="author"/>", the transformer 902 outputs "<xsl:apply-templates select="author" mode="customize-rule"/>".

If the loaded node is not a node value output command (step S207), the transformer 902 directly adds the loaded node to the output (step S210).

The XSLT transformer 902 repeats steps S206 to S210 until all nodes of the input XSLT document are processed, thus ending step S202.

Details of the process in step S203 in FIG. 40 will be described below with reference to FIG. 42.

In step S203, the XSLT transformer 902 transforms rules in the input definition document into XSLT templates, and adds them to the output.

More specifically, the XSLT transformer 902 loads one of rules from the input definition document (step S211). As a result, if the definition document has no more rules to be loaded (step S212), the transformer 902 ends the process in step S203.

After the rule is loaded, the XSLT transformer 902 adds a start tag of a corresponding template declaration to the output (step S213), and adds a match attribute of the addition component designation field in the loaded rule as that of the output template declaration (step S214). For example, if the rule begins with "<rule target="xml" match="author[position( )=1]">", the transformer 902 outputs "<xsl:template match="author[position( )=1]" mode="customize-rule">".

The XSLT transformer 902 then loads an output field of the rule, and the flow branches depending on the type of output field (step S215).

In this example, since input using a text box and that using a selection box are assumed as the types of output field of a rule, the flow branches depending on whether the input using a text box or that using a selection box is designated. Of course, by adding processes of other types as the branch destinations of step S215, the number of variations of functions to be added can be increased.

In the sequence example in FIG. 42, processes in steps S216 to S219 in case of the input using a text box are the same as those in steps S110 to S113 in FIG. 34. Also, processes in steps S221 to S226 in case of the input using a selection box are the same as those in steps S114 to S119 in FIG. 34.

On the other hand, in case of a non-editable node, the XSLT transformer 902 simply adds a "node value output command" of an input XSLT node to the output (step S226). At this time, the transformer 902 designates the current node as a select attribute. That is, the transformer 902 outputs, e.g., "xsl:value-of select="."/>".

After the aforementioned branch processes, the XSLT transformer 902 adds an end tag "</xsl:template>" of the template declaration to the output (step S220), and the flow returns to step S211 to process the next rule in the input definition document.

When the control leaves the loop in step S212 after the aforementioned processes are repeated, the process in step S203 ends.

In this embodiment, an XML document is used as an object to be transformed. However, the present invention is not limited to an XML document, but can be applied to other structured documents having the same nature as that of the XML document.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document editing apparatus comprising:
    an XSLT transformer configured to add an identification information assignment command to an XSLT node of a first XSLT document, the XSLT node referring to an XML node of an XML document, thereby to generate a second XSLT document including the XSLT node;
    an XSLT processor configured to generate an HTML document having an HTML node to which identification information is assigned in accordance with the identification information assignment command, using the second XSLT document and the XML document;
    a display which displays the HTML document;
    an update data input device configured to input node update information representing a change instruction to the HTML node of the HTML document, to thereby update the HTML node; and
    an XML document update device configured to update the XML node, based on the node update information, to thereby update the XML document, wherein the XML node is identified in the XML document according to the identification information which is assigned to the updated HTML node in the HTML document.

2. The apparatus according to claim 1, wherein the identification information assignment command is added in place of a node value output command in the first XSLT document.

3. The apparatus according to claim 1, wherein the identification information assignment command includes:
a command for outputting a component that bounds node values;
a command for obtaining a link to an input XML node;
a command for adding an obtained value to an immediately preceding output component as an attribute value; and
a command for outputting a node value.

4. The apparatus according to claim 1, wherein functions to be added by the XSLT transformer are externally controlled using a definition document.

5. The apparatus according to claim 4, wherein the definition document designates the functions added by the XSLT transformer, and locations where the functions are to be added.

6. The apparatus according to claim 4, wherein the functions includes updating an XML document based on an input at a text box or a candidate selected from a selection box.

7. A structured document server apparatus operable in communication with a browser, comprising:
an XSLT transformer configured to add an identification information assignment command to an XSLT node of a first XSLT document, the XSLT node referring to an XML node of an XML document, thereby to generate a second XSLT document including the XSLT node;
an XSLT processor configured to generate an HTML document having an HTML node to which identification information is assigned in accordance with the identification information assignment command, using the second XSLT document and the XML document;
a transmission device configured to transmit the HTML document to the browser;
a reception device configured to receive, from the browser, node update information representing a change instruction to the HTML node of the HTML document; and
an XML document update device configured to update the XML node, based on the node update information, to thereby update the XML document, wherein the XML node is identified in the XML document according to the identification information which is assigned to the updated HTML node in the HTML document.

8. The apparatus according to claim 7, wherein the identification information assignment command is added in place of a node value output command in the first XSLT document.

9. The apparatus according to claim 7, wherein the identification information assignment command includes:
a command for outputting a component that bounds node values;
a command for obtaining a link to an input XML node;
a command for adding an obtained value to an immediately preceding output component as an attribute value; and
a command for outputting a node value.

10. The apparatus according to claim 7, wherein functions to be added by the XSLT transformer are externally controlled using a definition document.

11. The apparatus according to claim 10, wherein the definition document designates the functions added by the XSLT transformer, and locations where the functions are to be added.

12. The apparatus according to claim 10, wherein the functions includes updating an XML document based on an input at a text box or a candidate selected from a selection box.

13. A structured document editing method comprising:
adding an identification information assignment command to an XSLT node of a first XSLT document, the XSLT node referring to an XML node of an XML document, thereby generating a second XSLT document including the XSLT node;
generating an HTML document having an HTML node to which identification information is assigned in accordance with the identification information assignment command, using the second XSLT document and the XML document;
displaying the HTML document;
inputting node update information representing a change instruction to the HTML node of the HTML document, to thereby update the HTML node; and
updating the XML node, based on the node update information, thereby updating the XML document, wherein the XML node is identified in the XML document according to the identification information which is assigned to the updated HTML node in the HTML document.

* * * * *